US010321344B2

(12) United States Patent
Barton et al.

(10) Patent No.: US 10,321,344 B2
(45) Date of Patent: Jun. 11, 2019

(54) SYSTEM AND METHOD TO FACILITATE TROUBLESHOOTING AND PREDICTING APPLICATION PERFORMANCE IN WIRELESS NETWORKS

(71) Applicant: CISCO TECHNOLOGY, INC., San Jose, CA (US)

(72) Inventors: Robert Edgar Barton, Richmond (CA); Jerome Henry, Pittsboro, NC (US); Gerard Ian McGarry, Vancouver (CA); Stephen M. Orr, Wallkill, NY (US); Santosh Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 192 days.

(21) Appl. No.: 15/596,715

(22) Filed: May 16, 2017

(65) Prior Publication Data

US 2018/0242178 A1 Aug. 23, 2018

Related U.S. Application Data

(60) Provisional application No. 62/460,514, filed on Feb. 17, 2017.

(51) Int. Cl.
*H04W 24/08* (2009.01)
*H04B 17/391* (2015.01)
*H04W 84/12* (2009.01)

(52) U.S. Cl.
CPC .......... *H04W 24/08* (2013.01); *H04B 17/391* (2015.01); *H04W 84/12* (2013.01)

(58) Field of Classification Search
CPC ..... H04W 24/08; H04W 84/12; H04B 17/391
See application file for complete search history.

(56) References Cited

U.S. PATENT DOCUMENTS 8,776,180 B2 7/2014 Kumar et al.
9,158,649 B2 10/2015 Bley
(Continued)

OTHER PUBLICATIONS

Cisco Systems, Inc., "QoS on Wireless LAN Controllers and Lightweight Aps Configuration Example," Products & Services, Document ID: 81831, Jun. 27, 2008; 18 pages.
(Continued)

*Primary Examiner* — Siming Liu
(74) *Attorney, Agent, or Firm* — Merchant & Gould P.C.

(57) ABSTRACT

An example method is provided in one example embodiment and may include gathering current wireless local area network (WLAN) data for a WLAN, wherein the WLAN data comprises network data, Radio Frequency (RF) data, and transmission data for a plurality of user equipment (UE) operating within the WLAN; generating a plurality of color maps; merging the plurality of color maps to generate a combined color map; and calculating a predicted application score for at least one UE operating within the WLAN based, at least in part, on application of the combined color map to a trained statistical model that represents linking relationships between the WLAN data gathered for the WLAN and a plurality of possible application scores for the plurality of UE. The plurality of color maps can include an RF color map, a transmission color map, and a Quality of Service color map.

20 Claims, 12 Drawing Sheets
(5 of 12 Drawing Sheet(s) Filed in Color)

(56) References Cited

U.S. PATENT DOCUMENTS

2010/0179756 A1 7/2010 Higgins et al.
2016/0036663 A1 2/2016 Bley

OTHER PUBLICATIONS

"CS231n Convolutional Neural Networks for Visual Recognition," First published on or about Feb. 5, 2015; 23 pages http://cs231n.github.io/convolutional-networks/.
"Gradient descent," from Wikipedia, the free encyclopedia, Mar. 26, 2017; 7 pages.
"IEEE 802.11e-2005," from Wikipedia, the free encyclopedia, Dec. 30, 2016; 7 pages.
"K-factor (Cisco)," from Wikipedia, the free encyclopedia, May 19, 2015; 2 pages.
"Machine learning," from Wikipedia, the free encyclopedia, Jan. 31, 2017; 15 pages.
"Mean opinion score," from Wikipedia, the free encyclopedia, Jan. 9, 2017; 4 pages.
Cisco Systems, Inc., "Chapter 9: Cisco Call Management Records K-Factor Data," from *Cisco Unified Communications Manager Call Detail Records Administration Guide*, OL-18716-01; first published on or about Aug. 2, 2014; 4 pages.
Cisco Systems, Inc., "CMX Location Analytics," Meraki Datasheet CMX, 2017; 4 pages.
Cisco Systems, Inc., "Quality of Service Packet Marking," Aug. 18, 2016; 23 pages.
Cisco Systems, Inc., "Troubleshooting," from *Cisco Application Centric Infrastructure Fundamentals*, first published on or about Dec. 19, 2014; 12 pages.
Klein, Phillippe, "802.11 QoS Overview," IEEE Plenary Meeting, Nov. 2008, Dallas, Texas, 38 pages.

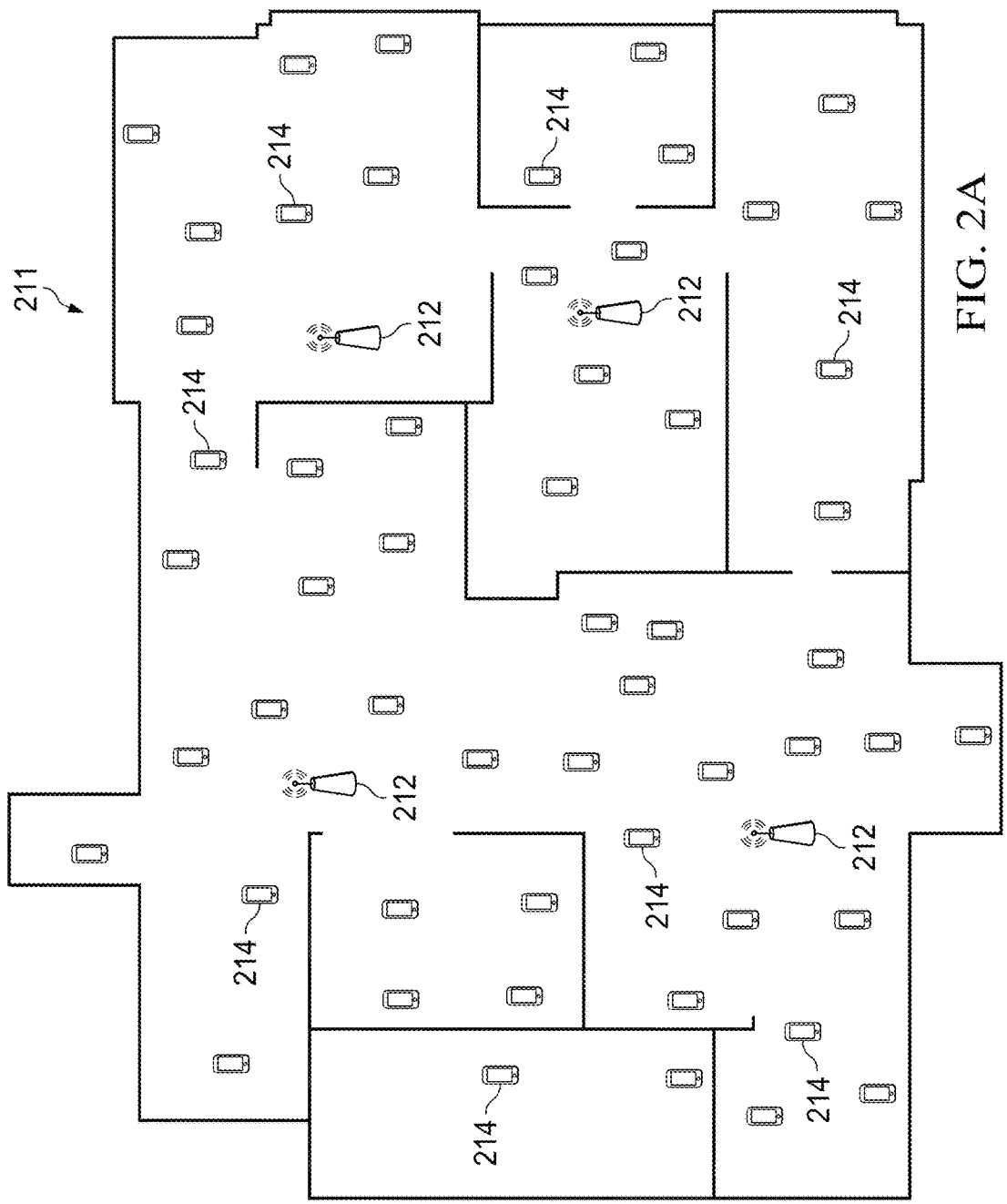

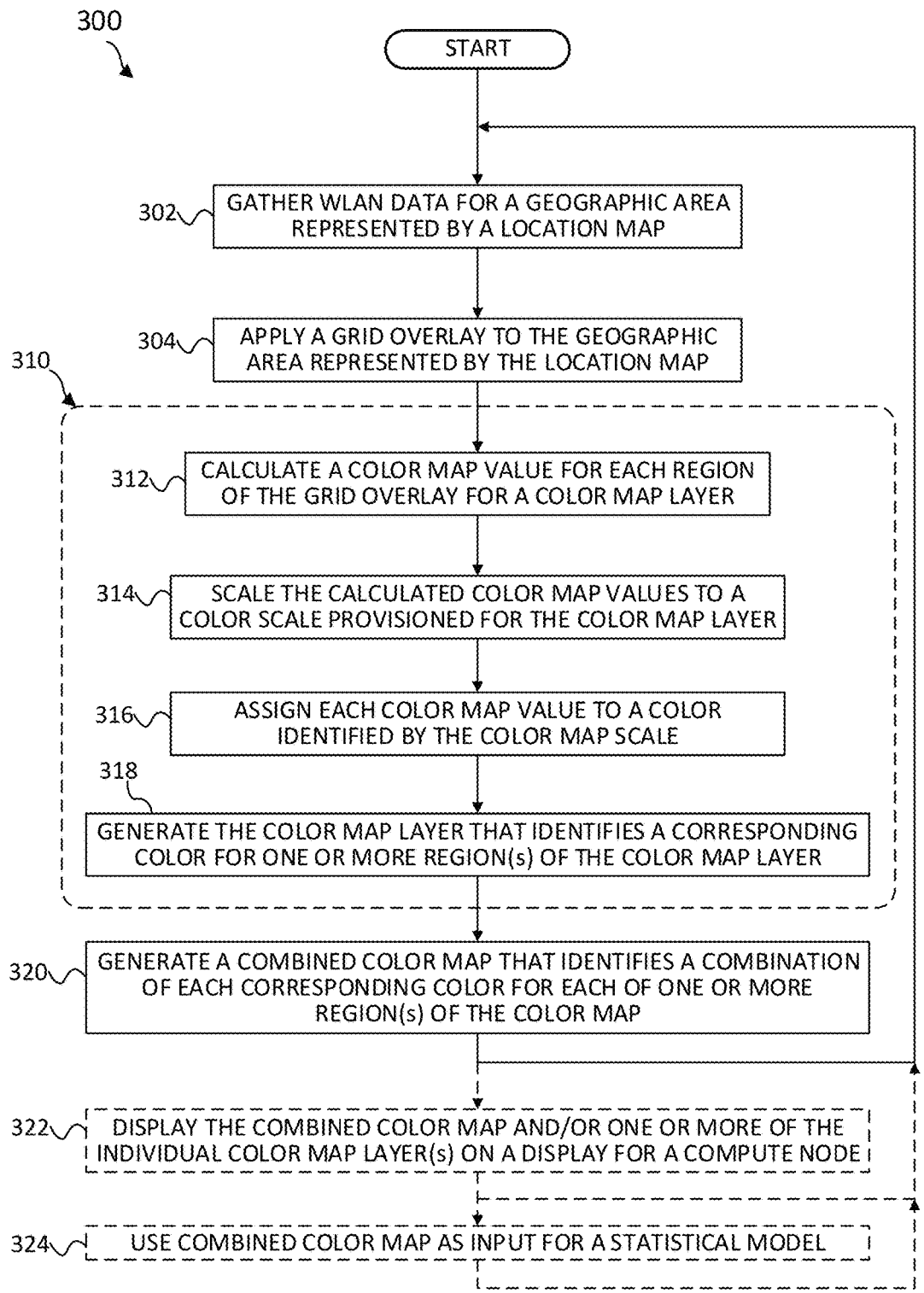

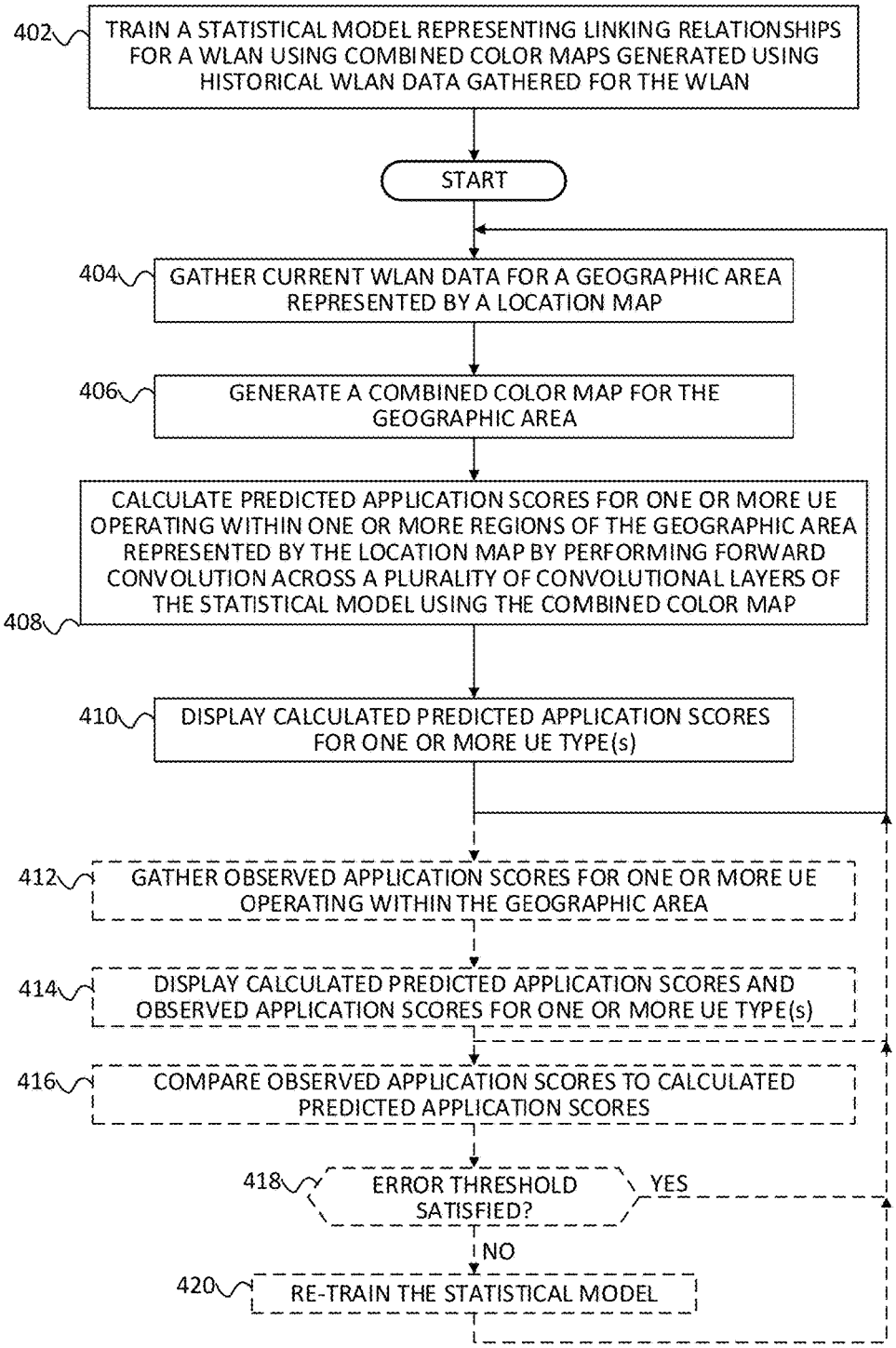

SYSTEM AND METHOD TO FACILITATE TROUBLESHOOTING AND PREDICTING APPLICATION PERFORMANCE IN WIRELESS NETWORKS

CROSS-REFERENCE TO RELATED APPLICATION

This application claims the benefit of priority under 35 U.S.C. § 119(e) to U.S. Provisional Application Ser. No. 62/460,514, entitled "APPLYING CONVOLUTIONAL TECHNIQUES TO TROUBLESHOOT AND PREDICT APPLICATION PERFORMANCE AND QUALITY OF EXPERIENCE IN WIRELESS NETWORKS," filed Feb. 17, 2017, which application is hereby incorporated by reference in its entirety.

TECHNICAL FIELD

This disclosure relates, in general, to the field of communication networks, and more particularly, to a system and method to facilitate troubleshooting and predicting application performance in wireless networks.

BACKGROUND

Networking architectures have grown increasingly complex in communication environments. Mobile communication networks have grown substantially in subscriber base as end users become increasingly connected to mobile wireless environments. As the number of mobile users increases, efficient management of communication environments becomes more critical. In some instances, service providers desire to manage wireless networks to improve application performance and, in turn, Quality of Experience (QoE) for mobile users across a communication system. However, there are significant challenges in managing wireless networks, particularly with regard to real-time troubleshooting of problems that can occur in a wireless network and determining causes of the problems.

BRIEF DESCRIPTION OF THE DRAWINGS

The patent or application file contains at least one drawing executed in color. Copies of this patent or application publication with color drawing(s) will be provided by the United States Patent and Trademark Office upon request and payment of the necessary fee. To provide a more complete understanding of the present disclosure and features and advantages thereof, reference is made to the following description, taken in conjunction with the accompanying figures, wherein like reference numerals represent like parts, in which:

FIGS. 2A-2G are simplified diagrams illustrating example details that can be associated with an example location map in accordance with one potential embodiment;

FIG. 3 is a simplified flow diagram illustrating example operations that can be associated with generating color map layers according one potential embodiment;

FIG. 4 is a simplified flow diagram illustrating example operations that can be associated with predicting an application score for a user equipment according to one potential embodiment;

DETAILED DESCRIPTION OF EXAMPLE EMBODIMENTS

Overview

Figure 1:
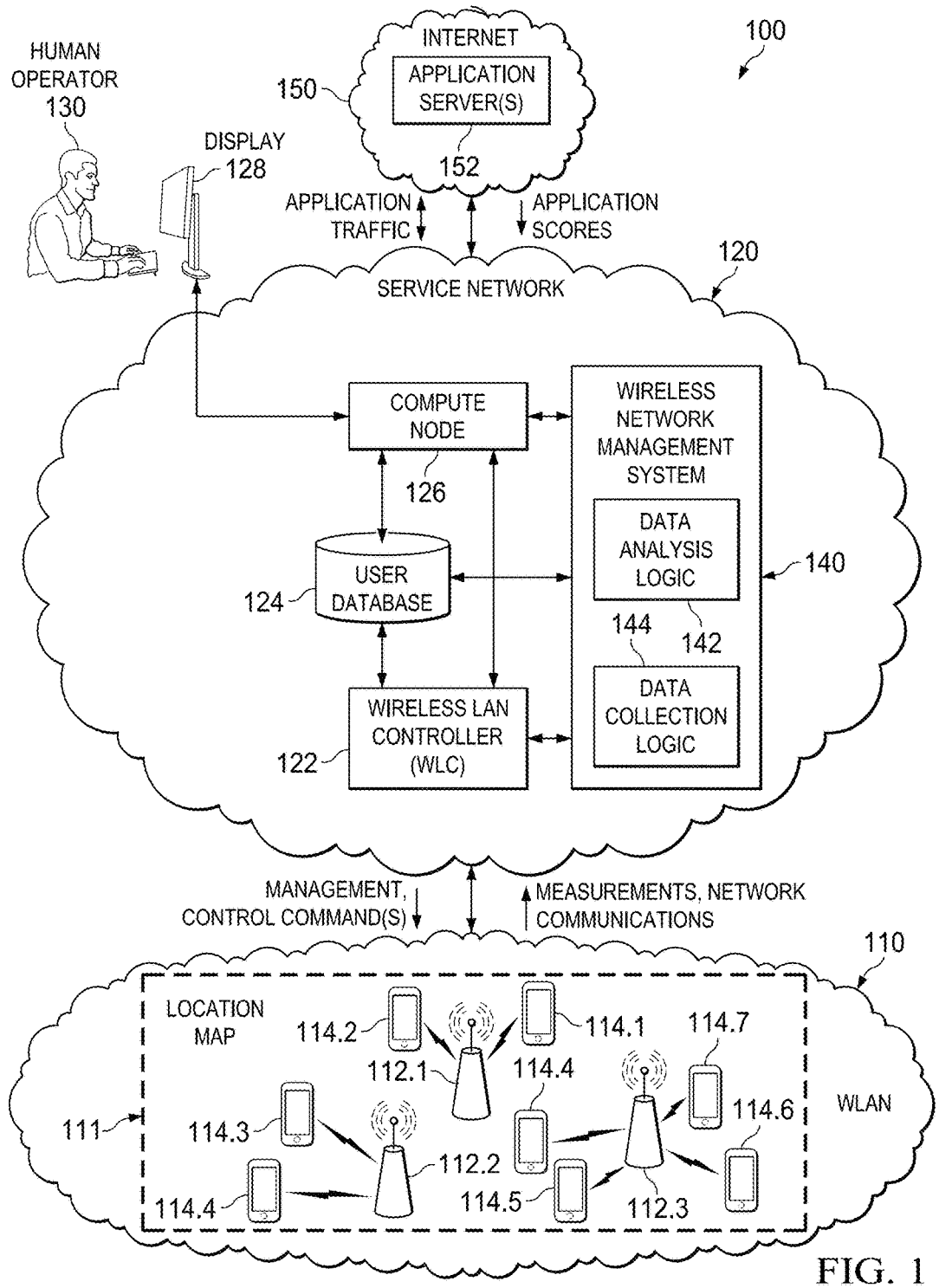
FIG. 1 is a simplified block diagram illustrating example details associated with a communication system that can facilitate troubleshooting and predicting application performance in wireless networks according to one embodiment of the present disclosure.

A method is provided in one example embodiment and may include gathering current wireless local area network (WLAN) data for a WLAN, wherein the WLAN data comprises network data, Radio Frequency (RF) data, and transmission data for a plurality of user equipment (UE) operating within the WLAN; generating a plurality of color maps, wherein each color map displays color information associated with operational characteristics of the WLAN; merging the plurality of color maps to generate a combined color map; and calculating a predicted application score for at least one UE operating within the WLAN based, at least in part, on application of the combined color map to a trained statistical model that represents linking relationships between the WLAN data gathered for the WLAN and a plurality of possible application scores for the plurality of UE. The plurality of color maps can include an RF color map associated with RF data gathered for the WLAN, a transmission color map associated with transmission data gathered for the WLAN, and a Quality of Service (QoS) color map associated with QoS packet marking data gathered for the plurality of UE. In some instances, the RF color map can illustrate brightness information indicating one or more RF signal deviations from averages.

In some cases, the method can further include gathering historical WLAN data over a plurality of time intervals; gathering historical application score data for each respective UE of the plurality of UE over the plurality of time intervals, wherein the historical application score data gathered for each respective UE is associated with application performance of a respective application operating via each respective UE over the plurality of time intervals; generating, for each time interval, a plurality of color maps; generating, for each time interval, a combined color map based on the plurality of color maps; and training the statistical model for each time interval using the combined color map and at least one historical application score for at least one UE. In some instances, the training can be performed to train the statistical model to converge towards a minimized error criterion. In still some instances, the statistical model can be trained for each of a plurality of application score classes.

In still some cases, the method can further include gathering a current application score for a particular UE operating at a particular location, comparing the current application score to a plurality of application score classes, identifying a particular application score class to which the current application score belongs, and identifying one or more operational characteristics of the WLAN that caused the current application score based on application of WLAN data for the particular UE at the particular location to the trained statistical model. In still some cases, the method can further include displaying at least one of: the predicted application score for the particular UE at the particular location on at least one color map of the plurality of color maps or on the combined color map; and the predicted application score and the current application score for the particular UE at the particular location on at least one color map of the plurality of color maps or on the combined color map.

In still some cases, the method can further include calculating an error between the current application score and the predicted application score, comparing the calculated error to an error threshold, and based on a determination that the calculated error does not satisfy the error threshold, re-training the statistical model using the current application score for the particular UE.

EXAMPLE EMBODIMENTS

Referring to FIG. 1, FIG. 1 is a simplified block diagram illustrating example details associated with a communication system 100 that can facilitate troubleshooting and predicting application performance in wireless networks according to one embodiment of the present disclosure. Communication system 100 for the embodiment of FIG. 1 includes a Wireless Local Area Network (WLAN) 110, a service network 120, and an internet 150. WLAN 110, service network 120, and internet 150 can be interconnected using one or more wired or wireless connections.

Service network 120 can include a wireless network management system (WNMS) 140, a Wireless LAN Controller (WLC) 122, a user database 124, and a compute node 126 having a display 128. A human operator 130 can also be present within communication system 100. The human operator 130 can interact with one or more systems, elements, etc. of service network 120 via compute node 126 and display 128. WNMS 140 can be provisioned with data analysis logic 142 and data collection logic 144. WNMS 140 can interface with compute node 126, user database 124, and WLC 122 using one or more wired or wireless connections. Although WNMS 140 is illustrated as a separate element for the embodiment of FIG. 1, in some embodiments functionality (e.g., logic, etc.) for WNMS 140 can be provisioned for compute node 126 and/or distributed across multiple compute nodes that may be deployed for service network 120.

WLAN 110 can include a number of wireless access points (WAPs) 112.1-112.3 and a number of user equipment (UE) 114.1-114.7. The terms 'user', 'UE', 'client', 'station' (STA), and variations thereof can be used interchangeably herein in this Specification to refer to a wireless device capable of connecting to a WAP via an over-the-air (OTA) Radio Frequency (RF) connection. The layout and/or location of each WAP 112.1-112.3 and/or UE 114.1-114.7 can be associated with a geographic area that may be represented using a location map 111. Although only a finite number of WAPs and UE are illustrated in the communication system 100, it should be understood that any number of WAPs and UE can be deployed and/or present in communication system 100 in accordance with various embodiments. Internet 150 can include one or more application server(s) 152, which can exchange application data with one or more UE 114.1-114.7 for various applications that may be operating on the UE. Application server(s) 152 can also communicate application performance information to WNMS 140.

In various embodiments, WLAN 110 can use any suitable technologies to facilitate the propagation of OTA RF communications between one or more WAP and one or more UE including wireless (e.g., Institute of Electrical and Electronics Engineers (IEEE) Standard 802.11 (e.g., Wi-Fi), HotSpot 2.0, IEEE Standard 802.16 (e.g., Worldwide Interoperability for Microwave Access (WiMAX)), millimeter wave (mm-wave), Radio-frequency Identification (RFID), Near Field Communication (NFC), Bluetooth™, or any other technology as may be defined by IEEE standards, Wi-Fi Alliance® standards, combinations thereof or the like) and/or wired (e.g., T1 lines, T3 lines, digital subscriber lines (DSL), Ethernet, etc.) communications.

OTA RF communications in WLAN 110 can be facilitated through the use of packets, often referred to as 'frames'. Various frame types can be utilized in IEEE 802.11 architectures including, but not limited to: management frames that enable communications between UEs and WAPs to be established and maintained; beacon frames that carry WAP and/or WLAN control information such as Basic Service Set Identifier (BSSID), Service Set Identifier (SSID), timestamps, etc.; and data frames that can carry communication protocol information and/or data. Generally, frames include a control field, source and destination Medium Access Control (MAC) addresses, and a payload or frame body. The control field can carry various control information and/or parameters including 802.11 protocol version, frame type information, etc.

For various embodiments discussed herein, WNMS 140 can operate to facilitate troubleshooting and predicting application performance for one or more geographic areas of WLAN 110 that may be represented by one or more location maps (e.g., location map 111). In general, application performance can be determined (e.g., observed or predicted) through the use of application scores calculated by application server(s) 152 for applications operating on UE 114.1-114.7 within the geographic area represented by location map 111 for WLAN 110. Application scores are typically used to relate Key Performance Indicators (KPIs) for an application to a numerical metric that can be used to evaluate performance of the application. Application scores are discussed in further detail herein. Application performance can be related to Quality of Experience (QoE), which can represent a measure of user satisfaction. For example, as application performance degrades for a particular user, the user's QoE can also be degraded and vice-versa. As application scores and QoE can be related, application QoE can be measured, which can express user satisfaction subjectively and objectively for an application.

In accordance with at least one embodiment, different color map layers, also referred to herein more generally as 'color maps', can be generated during operation via WNMS 140 for a given location map (e.g., location map 111) in order to provide visual and/or value based representation(s) for the geographic area represented by the location map for WLAN 110. Different color maps generated for a given location map can be used to indicate past, present, and/or predictive operational characteristics of any WAPs and/or UE that may be operating within the geographic area represented by the location map. In various embodiments, operational characteristics can include location information, performance information, measurement information, combinations thereof, and/or the like for one or more WAPs and/or UE that may be operating within the geographic area represented by a given location map. In some instances, as discussed in further detail herein, color maps generated by WNMS 140 can be used by a human operator (e.g., human operator 130) to monitor and/or troubleshoot application performance and/or QoE for one or more UE operating within a given geographic area of a WLAN.

Additionally, different color map layers for a given location map can be analyzed using statistical modeling performed by WNMS 140 in order to provide for the ability to:

1) identify or otherwise help to troubleshoot various relationships between operational characteristic(s) of the WLAN 110 that may be 'linked' or otherwise associated with application performance for one or more application(s) that may be operating via one or more UE within a particular geographic area of WLAN 110; and/or 2) predict application performance for one or more application(s) that may be operating via one or more UE within the particular geographic area of WLAN 110.

For purposes of illustrating certain example techniques of troubleshooting and predicting application performance for a WLAN (e.g., WLAN 110 of communication system 100), it is important to understand operations for wireless network environments. The following foundational information may be viewed as a basis from which the present disclosure may be properly explained. Such information is offered earnestly and for teaching purposes only and, therefore, should not be construed in a way to limit the broad applications and teachings of the present disclosure.

Companies expect similar operational characteristics from their WLAN(s) for business and/or mission critical applications as they do from their wired infrastructure(s). Real-time applications for collaboration, such as, for example, Jabber®, Skype®, wireless desk phones, wireless telepresence endpoints (e.g., DX units as manufactured by Cisco Systems, Inc.), etc. are extremely sensitive to poor wireless performance. Currently, there are limited mechanisms for troubleshooting real-time applications over WLANs with regard to network and/or RF quality issues and network administrators are often left in the dark as to the root cause(s) of such issues.

For example, a company may have excellent voice or video quality over WLAN in one location, but may have serious issues in another with no clear understanding of why the difference in quality exists. In another example, some users in a given location may report issues and others in the same location may not report any issues. In still another example, users at a given location may not report an issue at one time but then report issues for the location at another time. Performance of mission critical applications in an RF environment can be dependent on multiple factors including, but not limited to: RF coverage, RF Characteristics (e.g., density of users competing for access, type of application competing for access, etc.), UE hardware (HW) and/or software (SW) characteristics (e.g., UE type, brand, model, firmware version, Operating System (OS) version, etc.), configured Quality of Service (QoS) settings, and/or end-to-end delay and/or jitter.

Measurement of real-time application scores can be provided using indexes such as Mean Opinion Score (MoS), Multi-QoE, K-Factor, or others. Such indexes can be used to provide value-based indications of application-specific metrics (e.g., packet error or drop rates, packet counts, other packet metrics such as end to end delay or jitter, audio and/or video quality, etc.). Further, there exist multiple mechanisms for network administrators to evaluate operation of a WLAN using measureable characteristics such as RF communication link (e.g., connection) quality, metrics such as Channel Utilization (CU), Receive Signal Strength Indicator (RSSI), Signal to Noise Ratio (SNR), retries, and/or other measurable characteristics and/or metrics.

Observing a specific combination of metric values (e.g., high retry rate+low RSSI+low SNR) and projecting a correlated low real-time application QoE can be trivial. However, when RF metrics are not obviously degraded, correlating low real-time application scores with RF parameters and/or other operational characteristics of a WLAN and determining a root cause of the performance issue can be much more difficult.

Thus, when WLANs (e.g., WLAN 110) suffer from poor application performance (specifically, for real-time applications), it can be difficult to identify the root cause of the poor performance. As noted previously, application performance can be measured in a number of ways such as, for example, through the perceived quality of a Voice/Video call (e.g., low MOS scores indicating poor perceived quality, etc.). When low quality scores for a given application call of a given UE are observed, it is indicative of problems that can occur anywhere along the end-to-end path of the application call within any of the elements of a WLAN, the wired network interconnecting elements of the WLAN, and/or the UE itself.

Customers and end users desire better tools to manage real-time application deployments for WLANs; yet, there is currently no reliable tool to provide such management for current deployments. Most current methods used for measuring WLAN performance either measure an application's "performance" (e.g., based on application-specific metrics) or measure RF characteristics for the WLAN and then "guesstimate" the possible impact on real-time applications (and therefore a real-time application's estimated QoE, such as MOS or other index). However, no current methods for measuring WLAN performance examine the potential issues that may be present in a holistic manner. For example, in some instances, problem(s) can be further related to a number of additional variables such as location, time of day, interference, excessive contention, UE type, etc.

Embodiments of communication system 100 described herein can overcome the aforementioned issues (and others) by providing for the ability to facilitate troubleshooting and predicting application performance for a WLAN (e.g., WLAN 110) in order to facilitate the management of real-time application deployments for the WLAN. In various embodiments, the systems and methods described herein can be used to combine measured application data, WLAN data, and/or UE data with location tracking and Machine Learning (ML) techniques to determine troublesome areas and/or to exclude the impact of an area of a WLAN in order to determine an issue for an area of the WLAN and give insight into the potential root cause of real-time application score issues.

Embodiments of communication system 100 provide for the ability to group correlated data associated with WLAN 110 in order to better estimate and/or identify which combination of WLAN variable(s) and/or variable type(s) or, more generally, 'operational characteristics', that may trigger application score degradation for each of one or more detected and measured event(s) for each of one or more UE (e.g., any combination of UE 114.1-114.7) that may be operating within a given geographic area (e.g., location map 111) within WLAN 110. Using WLAN data (e.g., performance information, measurement information, network information, etc.) gathered for the given geographic area of WLAN 110, a statistical model can be trained to predict application scores based on information gathered for the geographic area of the WLAN. Embodiments of communication system 100 may also provide for the ability to operate in the opposite direction; by applying convolutional processing techniques, characteristics that trigger a resulting observed application score can be learned and/or predicted using the trained statistical model.

As referred to herein in this Specification, the term 'application score' can be used to refer to a measured or predicted value or metric that indicates the performance and/or 'perceived' performance of an application operating on a given UE. A perceived performance can be an indication of how well a user associated with a given UE may perceive the performance of an application operating on the UE. In some instances, an application score may be referred to as a 'Health Score', an 'application QoE score', a 'call QoE score', a 'QoE value', a 'call score', and/or variations thereof. It should be understood that any metric or value that may be used to indicate the performance and/or perceived performance of an application operating on a given UE can be considered an application score within the scope of the teachings of the present disclosure. Further, it should be understood that the terms 'operating', 'operations', and variations thereof can include active and background operations involving UE applications (e.g., a user can switch between applications operating on a given UE such that one application may be operating in a foreground of a user interface of the UE with one or more other applications operating in the background for the UE).

In at least one embodiment, operations for communication system 100 can include WNMS 140 gathering WLAN data for a geographic area associated with a WLAN (e.g., location map 111 for WLAN 110) in which WLAN data can include, but not be limited to, RF data (e.g., RSSI, SNR, etc. gathered via WLC 122), transmission data (e.g., frame retry data, transmission Modulation and Coding Scheme (MCS) data, etc. gathered via WLC 122), and network data (e.g., QoS packet marking information, etc.) gathered via data collection logic 144 for each UE (e.g., UE 114.1-114.7) and for each WAP (e.g., WAPs 112.1-112.3) associated with the geographic area of the WLAN. In some instances, WLAN data can further include UE HW and/or SW characteristic data (e.g., UE type, brand, model, firmware version, Operating System (OS) version, application version (e.g., version number, 'pro' vs. 'lite' version, etc.), combinations thereof, and/or the like). The operations can further include gathering application score data for each of the respective UE via one or more application server(s) (e.g., application server(s) 152) and generating color map layers for the geographic area in which each color map layer displays color information associated with operational characteristics of the WLAN.

Color map layers generated for the geographic area can be combined to generate an overall color map. Using Digital Image Processing (DIP) and Convolutional Neural Network (CNN) processing techniques, color maps generated by WNMS 140 using current or historical WLAN data can be applied to a statistical model in order to train or re-train the statistical model during a learning phase to converge towards (e.g., minimize) a certain error criterion in order to learn relationships between various operational characteristics of the WLAN that may impact application scores (e.g., that may cause improved or degraded application scores). A convolutional neural network, also referred to herein as a convolutional neural network model or statistical model, is a type of supervised learning statistical model that can learn these relationships through iterative processing. For supervised training, input data (e.g., combined color maps for historical or current WLAN data) and outcome data (e.g., application score(s) for the same historical or current WLAN data) can be iteratively applied to the model to train the convolutional neural network.

In various embodiments, the statistical model can be trained or re-trained until the error criterion is met, until a predetermined number of training iterations have been performed, or until expiration of a predetermined training time. In at least one embodiment, gradient descent can be used via backpropagation operations involving the statistical model to evaluate and minimize error for the statistical model in order to cause the model to converge towards the error criterion. In various embodiments, an error criterion can be provisioned as a threshold value, percent difference, or the like that can represent the difference between a value (e.g., an application score) calculated using the statistical model and a value gathered from an external source (e.g., an application score gathered from an application server 152).

Once the statistical model is trained, WLAN data gathered for WLAN 110 for a particular time interval can, in some embodiments, be applied to the trained model to predict application scores for one or more locations and for one or more UE type(s) that may be operating in the WLAN. In still some embodiments, the trained statistical model can be used to identify operational characteristics that may trigger a resulting observed application score for one or more UE type(s).

Thus, communication system 100 provides for the ability to gather historical or current application scores (e.g., MOS values, etc.) for UE within a particular geographic area of the WLAN 110 and to use the application scores to evaluate and determine which operational characteristics for the geographic area contribute to the applications scores through training a convolutional neural network statistical model. Upon training the statistical model, application scores can be reliably predicted (e.g., instead of starting from RF threshold assumptions and "guesstimating" a possible result) using current WLAN data gathered from the WLAN 110, which can enable a human operator (e.g., human operator 130) and/or WNMS 140 to manage various facets of WLAN 110. Because learning is local to WNMS 140, different causes can be identified to the same quality result, based on multiple criteria (e.g., location, time, hardware and/or software type, etc.).

Contributing factors can be reported using statistical contribution or weighting estimates identified for a trained statistical model. Highly correlated factors can then be used as a model to evaluate future application quality which can help network administrators design their WLANs for one or more WLAN locations and/or correct their network designs and deployments and/or can help hardware vendors tune their RF algorithms (e.g., for setting bit rates, power, interference cancellation types and/or parameters), combinations thereof, and/or the like for certain packet types in certain conditions. Thus, the system and method provided by communication system 100 can offer a business benefit to software and/or hardware developers as well as a powerful tool for end-customers and/or users. Accordingly, communication system 100 provides a comprehensive technique to observe, troubleshoot, predict, and/or repair voice and/or other application issues in that may occur within a WLAN.

Figure 2B:
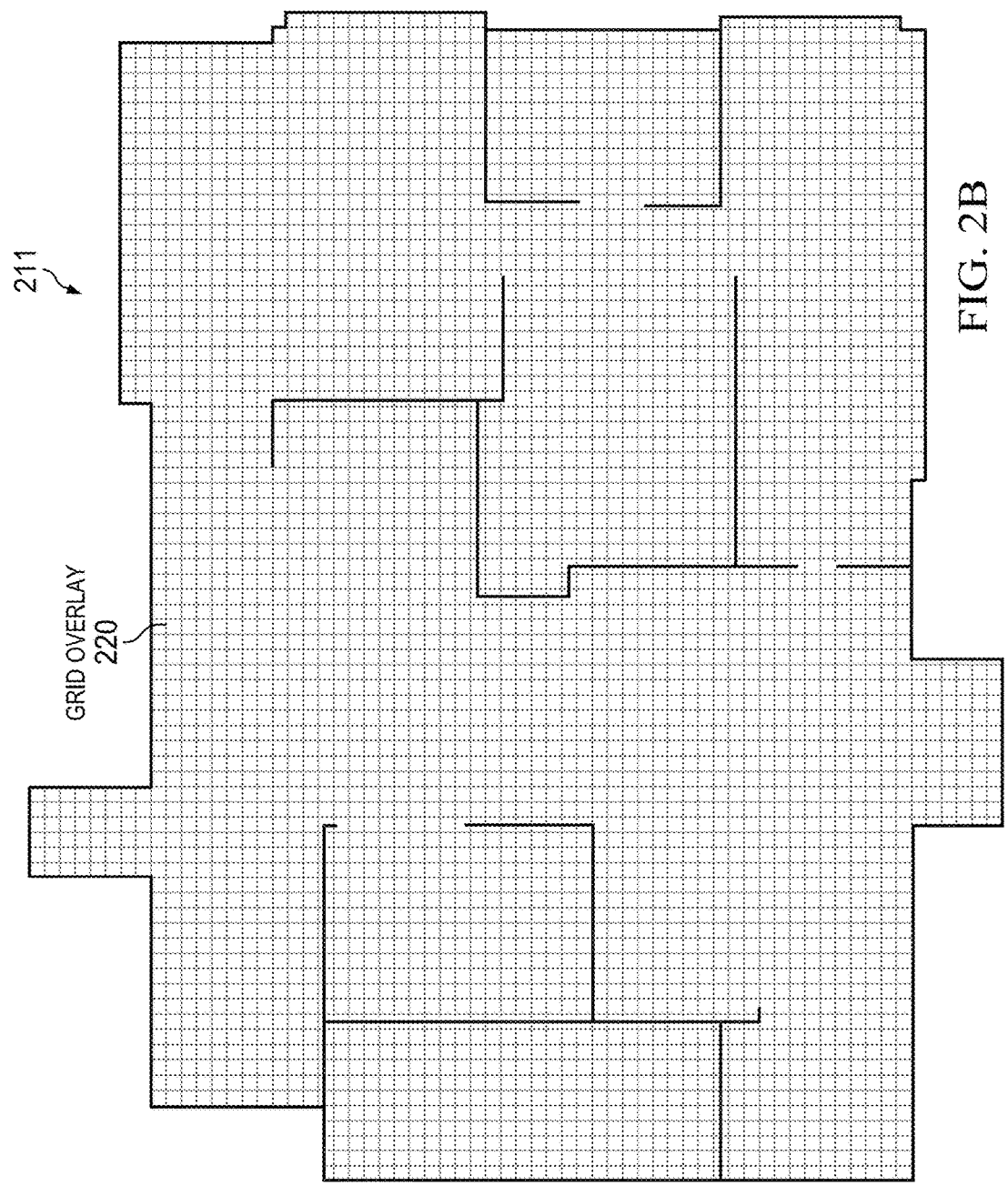

FIGS. 2A-2G are a simplified diagrams illustrating example details that can be associated with an example location map 211 in accordance with one potential embodiment. FIG. 2A illustrates example location map 211, which can represent the geographic area for a floor of a structure. A number of WAPs 212 that can be deployed within the geographic area are identified on the location map 211. A number of UEs 214 are also illustrated for the location map 211. It should be understood that the number and location of WAPs and UEs illustrated for example location map 211 are provided for illustrative purposes only and are not meant to limit the broad scope of the teachings of the present disclosure.

FIGS. 2B-2G illustrate various example details that can be associated with color map layers that can be generated for the location map 211. For the discussion of FIGS. 2B-2G, WAPs 212 and UEs 214 may be referenced, however, these elements are not shown in FIGS. 2B-2G in order to illustrate other features related to color map layers that can be generated for the location map 211.

As discussed previously, WNMS 140 can gather WLAN data for a geographic area associated with a WLAN such as, for example, the geographic area associated with location map 211. For the embodiment of FIGS. 2A-2G, WNMS 140 can gather WLAN data for a geographic area identified by location map 211. The WLAN data gathered for the geographic area can include RF data, transmission data, and network data gathered for each UE (e.g., UEs 214) and for each WAP (e.g., WAPs 212) associated with the geographic area. In some instances, WLAN data can further include UE HW and/or SW characteristic data for the UE in operating in the geographic area.

The system and method provided by communication system 100 provides for grouping operational characteristics for UE operating in a geographic area into three different internally coherent categories. One first such category includes RF signal characteristics, for example UE RSSI at the WAP level, UE SNR at the WAP level, and noise floor at the WAP level. For example, let the term '$s_{x_n^i}$' represent the signal quantity of an $n^{th}$ frame represented by '$x_n^i$' that is transmitted by an ith UE represented as '$t_{x^i}$' and received on a kth WAP represented as '$A^k$' as shown in Equation 1 (Eq. 1), below.

$$s_{x_n^i} = (R_{x_n^i} - N_{x_n^i}) + a \qquad \text{Eq. 1}$$

For Eq. 1, the term '$R_{x_n^i}$' can represent the frame RSSI value, as determined by $A^k$, the term '$N_{x_n^i}$' can represent the SNR of the frame, as determined by $A^k$, and the term 'a' can represent a normalizing variable that can be used to normalize s on a scale with an origin of zero (0). For each $n^{th}$ frame $x_n^i$ received at each WAP $A^k$, $t_{x^i}$ can be mapped to geographical coordinates [X, Y] as shown in Equation 2 (Eq. 2), below.

$$g(t_{x^i}) = \{X(t_{x^i}), Y(t_{x^i})\} \qquad \text{Eq. 2}$$

The geographical coordinates can be mapped using various methods such as, for example, RSSI trilateration, triangulation, Angle of Arrival (AoA), combinations thereof, or the like. The accuracy of the geographical coordinates can be varied depending on needs and implementations.

The terms $R_{x_n^i}$ and $N_{x_n^i}$ can be functions of UE (e.g., $t_{x^i}$) distance to $A^k$, while the noise floor, which can be represented as '$Nf_{A^i}$' can be measured at $A^k$ while receiving frames $x_x^i$, is not directly related to $t_{x^i}$ distance to $A^k$. However, $R_{x_n^i}$, $N_{x_n^i}$ and $Nf_{A^i}$ may be subjected to variation over time, including in cases where $t_{x^i}$ does not move. Therefore, it is valuable to organize UE characteristic collections around sampling time slices.

For example, let the term '$\tau_j$' represent a sampling time slice for some delta time interval 'j' around which color map layers can be generated. A value for $\tau_j$ can be determined using various methods. In at least one embodiment, $\tau_j$ can be determined based on an assumption that $\tau_j$ should be small enough that the variation of signal changes for all received $\Sigma x_n^i$ from all $t_{x^i}$ at all $A^k$ over $\tau_j$ is below a target threshold. It is expected that $R_{x_n^i}$ (as measured at $A^k$) can undergo wide variations from one $x_n^i$ to the next for the same given transmitting $t_{x^i}$. However, $R_{x_n^i}$ is expected to revolve around a particular value for any relatively idle (e.g., not moving) $t_{x^i}$.

In accordance with at least one embodiment, $\tau_j$ can be determined by WNMS 140, via data analysis logic 142, selecting an artificially small but non-null time interval, which can be represented using the term '$\delta$', and a random quantity of $t_{x^i}$ to sample. Based on the sampling, the harmonic mean, which can be represented using the term '$H_\delta$' of each component $R_{x_n^i}$ and $N_{x_n^i}$ of all sampled m frames received within $\tau_j$ can be determined, as shown in Equation 3 (Eq. 3) and Equation 4 (Eq. 4), below.

$$H_{\delta(R_{x_n^i})} = \left( \frac{m}{\Sigma_{i=1}^m R_{x_n^i}^{-1}} \right) \qquad \text{Eq. 3}$$

$$H_{\delta(N_{x_n^i})} = \left( \frac{m}{\Sigma_{i=1}^m N_{x_n^i}^{-1}} \right) \qquad \text{Eq. 4}$$

Equations 3 and 4 can be simplified, using an informal shortcut, to arrive at Equation 5 (Eq. 5), below.

$$H_{\delta(t_{x^i})} = \left( \frac{m}{\Sigma_{i=1}^m t_{x^i}^{-1}} \right) \qquad \text{Eq. 5}$$

Using the harmonic mean (instead of another mean) provides for the ability to limit the impact of $R_{x_n^i}$ and $N_{x_n^i}$ outliers. As it can be expected that two any $t_{x^i}$ are not likely to be at the same position relative to their measuring $A^k$, it can be expected that $H_{\delta(x^i)}$ will be distributed for all $t_{x^i}$ over the possible ranges of $R_{x_n^i}$ and $N_{x_n^i}$.

Next, WNMS 140, via data analysis logic 142, can determine $H_{(\delta+1)(t_{x^i})}$ and deduce the variation, which can be represented using the term '$\sigma_{\delta(t_{x^i})}$', of $H_{(t_{x^i})}$ from $\delta$ to $\delta+1$ through calculations that can be performed using Equation 6 (Eq. 6), as shown below.

$$\sigma_{H\delta(t_{x^i})} = \left| H_{(\delta+1)(t_{x^i})} - H_{\delta(t_{x^i})} \right| \qquad \text{Eq. 6}$$

The average variation over n sampled $t_{x^i}$ can then be determined through calculations that can be performed using Equation 7 (Eq. 7), as shown below.

$$\sigma_{H\delta} = \frac{1}{n} \Sigma_{i=1}^n \left| H_{(\delta+1)(t_{x^i})} - H_{\delta(t_{x^i})} \right| \qquad \text{Eq. 7}$$

Eq. 7 can be used to determine the variation between $\delta$ and a later interval $\delta+j$ as illustrated in Equation 8 (Eq. 8), below.

$$\sigma_{H\delta n} = \frac{1}{n} \Sigma_{i=1}^n \left| H_{(\delta+j)(t_{x^i})} - H_{\delta(t_{x^i})} \right| \qquad \text{(Eq. 8)}$$

As $\sigma_{H\delta_j}$ increases, the global RF state of the geographic area at $\delta$ and the global RF state of the geographic area at $\delta+j$ will diverge. Any arbitrary threshold for $\sigma_{H\delta}$ can be configured for WNMS 140, which the data analysis logic 142 can use to determine when divergence is beyond acceptable level. The interval $((\delta+j)-\delta)$ where $\sigma_{H\delta_j}$ is beyond the chosen acceptable threshold determines $\tau_j$.

It should be understood that it is possible that $\tau_j * \tau_{j+n}$. However, this non-equivalence may not impact the determination of $\tau_j$ as the system and method provided by communication system 100 can be constrained to a stable $$H_{\delta(t_{x^i})}$$

rather than consistent time-slice duration(s).

A first list of operational characteristics that may contribute to an overall application score can be identified for WNMS 140 (e.g., by human operator 130 via compute node 126). The operational characteristics can include, but not be limited to: UE RF signal conditions (RSSI, SNR); connected UE unicast RF Data rate; connected UE multicast RF Data rate and/or WLAN lowest mandatory data rate; UE retries (e.g., upstream retries and/or downstream retries); UE HW/SW characteristics (e.g., UE type, OS version, firmware version, etc.); device location; QoS packet markings; Transmission Control Protocol (TCP) performance (e.g., window size, retries easily accessible from sources such as Netflow, etc.); and/or external conditions outside the WLAN.

Based on the list, WNMS 140 can be provisioned (e.g., by human operator 130 via compute node 126) with various linking relationships for characteristics identified in the list that may be directly correlated and may impact application performance. In at least one embodiment, RF operational characteristics identified in the list can be directly correlated. For example, higher RSSI can be directly correlated to higher SNR for any given location with a stable noise floor. Thus, RF operational characteristics can be grouped as a deterministic table such that, for a given location and/or noise floor and a given device characteristic, an SNR range can be translated to a stable RSSI range equivalent.

In various embodiments, other linking relationships can be provisioned for WNMS 140 including, but not limited to: RF conditions can be directly correlated to data rate (e.g., higher RSSI and SNR can result in higher data rate); data rates can also be related to device characteristics (e.g., device hardware and/or software can determine rate shifting thresholds); changes in RF conditions can effect transmissions parameters (e.g., retries); physical location can effect RF condition parameters and transmission parameters; WLAN QoS packet markings (e.g., 802.11e User Priority (UP) values) can be used to determine which Access Category (AC) a frame is transmitted from and its overall media contention dynamics, which can affect client transmission parameters; combinations thereof; and/or the like.

WNMS 140, via data analysis logic 142, can analyze these relationships using at least three separate color map layers, which can be analyzed separately and/or in combination to train, in a learning phase, a predictive convolutional neural network statistical model that can be used to predict application performance and/or QoE for one or more UE operating within a particular geographic area of a given WLAN. As discussed in further detail herein, the statistical model can be configured with various relationships that may impact application performance in order to learn one or more possible combinations of operational characteristics that may impact application performance at one or more location(s) for one or more UE type(s).

In at least one embodiment, WNMS, 140 data analysis logic, can provide for the visualization of a given geographic area represented by a given location map using different color map layers. Through use of a grid-like image made up of arbitrarily small units, which can be represented as pixels, shapes (e.g., squares, polygons, etc.), or the like, that can be overlaid on a location map, different colors can be displayed for each color map layer of the location map such that certain colors can be associated with certain operational characteristics of UE of a same UE type that may be operating within the geographic area represented by the location map. In at least one embodiment, the color map layers can include: (1) an RF color map layer, (2) a Transmission color map layer, and (3) a QoS color map layer.

Referring to FIG. 2B, FIG. 2B is a simplified diagram illustrating example details that can be associated with location map 211 to which a grid overlay 220 made up of a grid of predetermined shapes in which each predetermined shape can include a number of pixels can be applied during operation to generate various color maps that may be valid for a particular sampling time slice $\tau_j$. Any predetermined shape can be configured for a grid overlay in accordance with various embodiments described herein such as, for example, a square, a rectangle, a polygon, or the like that may provide for the ability to partition a location map into uniformly sized regions such that each individual region can be identified using a Cartesian coordinate system.

During operation, each region (e.g., square, rectangle, polygon, etc.) can be assigned a color for each of one or more color layer(s) and/or a combined color map generated by merging multiple color map layers. In some embodiments, areas at the edges of a location map can be reapportioned into half-sized shapes, quarter-sized shapes or the like (e.g., for a given shape type used for a grid overlay) to provide for the ability to cover a geographic area represented by a given location map. In some embodiments, the Cartesian coordinate system can be a two-dimensional X-Y coordinate system (e.g., in order to identify particular regions of a floor for a structure). In still some embodiments, the Cartesian coordinate system can be a three-dimensional X-Y-Z coordinate system (e.g., to identify particular regions of multiple floors of a structure).

The resolution of a pixel can depend on the smallest addressable element of a display device and therefore can be varied depending on display of a color maps and/or color map layers on different display devices and/or different resolutions. A pixel can be artificially as small as the desired resolution unit of a location map. Due to the potentially infinitesimal size of a pixel, pixel resolution for FIGS. 2B-2G is not shown. For example embodiments discussed herein, grid overlay 220 can be represented and discussed in reference to square shapes for the grid overlay. However, it should be understood that this does not limit the broad scope of the teachings of the present disclosure. Shapes and shape sizes, which can potentially be as small as a pixel size, used for a grid overlay can be determined based on any needs and implementations. In some discussions herein, pixels and squares of color maps and/or color map layers can be referred to collectively using the term 'pixel/square'.

RF Color Map Layer Generation

Upon determination of a particular sampling time slice $\tau_j$, WNMS 140, via data analysis logic 142, can determine various $t_{x^i}$ that may be transmitting at various locations of the grid overlay 220. As discussed, the transmitting $t_{x^i}$ can be detected and their locations determined in relation to the location map 211 using an active location or triangulation method (e.g., RSSI trilateration, AoA, etc.). Squares represented via the grid overlay 220 can include 0 or more UE $t_{x^i}$.

One first group of correlated parameters can include $$H_{\delta\left(R_{x_n^i}\right)} \text{ and } H_{\delta\left(N_{x_n^i}\right)}.$$

In at least one embodiment, WNMS 140, via data analysis logic 142, can assign to each square of the grid overlay 220, for which one or more $t_{x^j}$ are detected during $\tau_j$, an 8-bit number representing the quantity s for each square. For example, say standard RSSI spans from −92 decibel milliwatts (dBm) to −20 dBm for a given deployment, and standard SNR spans from 0 to 55 dB in for the deployment. Thus, $R_{x^j}-N_{x^j}$ for an individual $t_{x^j}$ can span from 35 to −92 for the deployment. It should be noted that the quantity s is meant to be an abstract number, which allows for the establishment of a comparative scale between transmitted frames within the sampling time slice $\tau_j$. It should further be noted that Eq. 1 incorporates RSSI twice, which provides for the ability to increase the RSSI weight in the color scale for the RF color map. Recalling the variable a defined for Eq. 1, a can be used to normalize s on a scale with 0 for origin. For example a can be set to a value of a=92 such that $s_{x^j}$ for an individual $t_{x^j}$ may span from 0 to 127 for a 128-increment color scale. Other values of a can be determined in order to illustrate other color-based information for an RF color map layer.

In some embodiments, arithmetic mean calculations can be used to average the $s_{x^j}$ values of all $t_{x^j}$ that may be present in a given square of a grid overlay, and, if a 128-increment scale is used for each $t_{x^j}$, the result can be normalized to a 256-increment scale using calculations based on Equation 10 (Eq. 10), as shown below.

$$s = \frac{2}{n}\Sigma_{i=1}^{n} s_{x^i} = \frac{2}{n}\Sigma_{i=1}^{n}(R_{x^i} - S_{x^i} + a) \qquad \text{Eq. 10}$$

In at least one embodiment, an 8-bit color scale can be used to represent 256 different color increments of s for a given color scale defined for a given RF color map layer. However, other scales and/or other reference values may be set depending on various needs and implementations.

A resultant RF color map layer for a grid overlay can display initial RF operational characteristics, in which each square for which a $t_{x^j}$ was detected will receive an 8-bit color value. In at least one embodiment, as a statistical model is trained, arithmetic means can be taken over several $\tau_j$ to average the color value for various squares of the grid overlay for an RF color map.

Figure 2C:
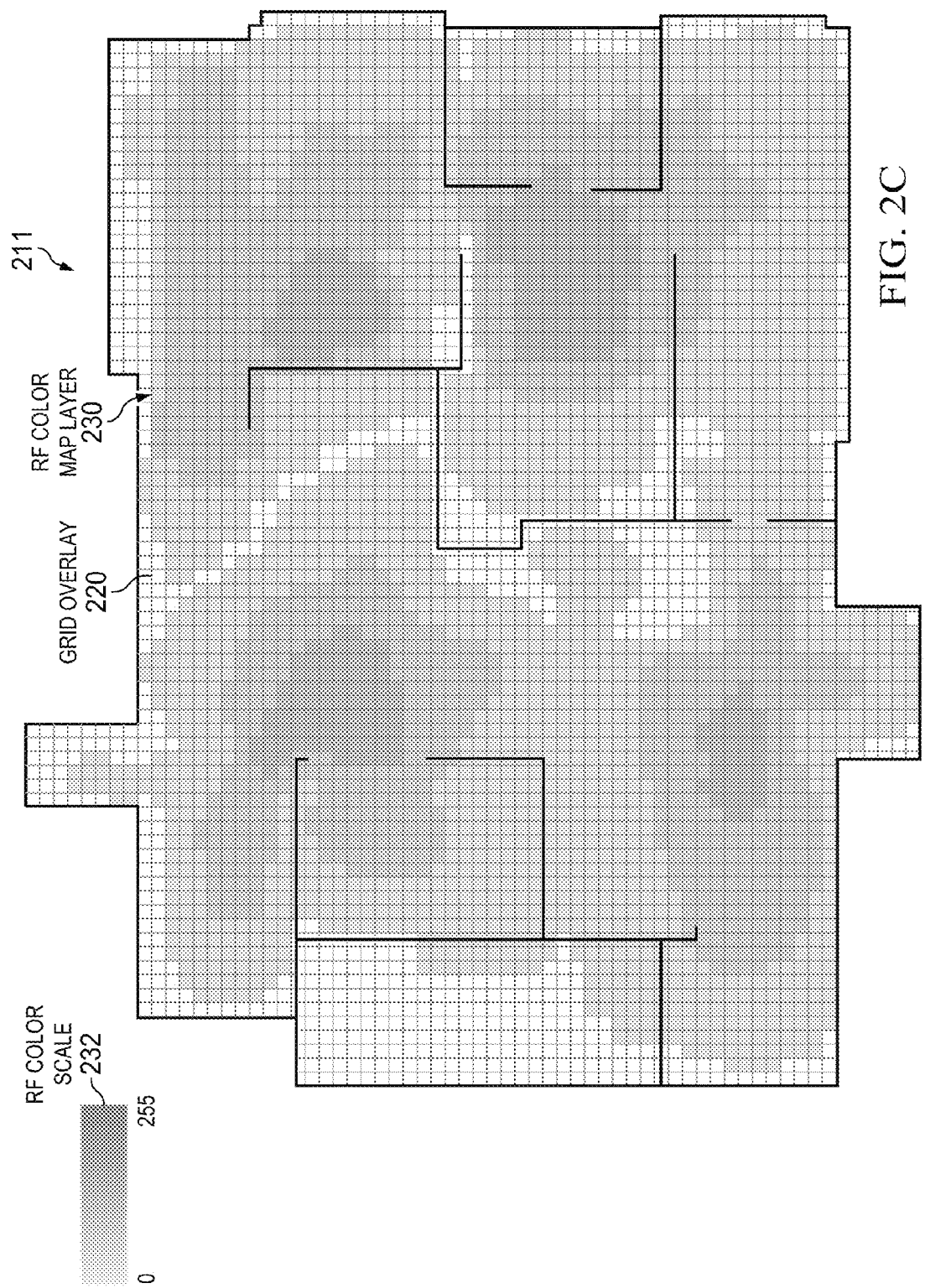

Referring to FIG. 2C, FIG. 2C is a simplified diagram illustrating example details that can be associated with an RF color map layer 230 that may be generated for the location map 211 for a given sampling time slice $\tau_j$ in accordance with one potential embodiment. For the embodiment of FIG. 2C, RF color map layer 230 displays RF characteristics for the location map using different colors of green. However, it should be understood that any color can be configured for an RF color map layer depending on needs and implementations and may be configured by a network administrator or the like for WNMS 140.

FIG. 2C further illustrates an RF color scale 232 that can be used to indicate certain RF operational characteristics for the RF color map layer 230. For example, in at least one embodiment, darker colors can be used to indicate stronger RF signal strengths and lighter colors can be used to indicate weaker RF signal strengths. However, other color associations can be envisioned depending on needs and implementations. For the embodiment of FIG. 2C, RF color scale 232 identifies colors ranging from a value of 0 for a lightest color (e.g., weakest RF signal strength) to 255 for a darkest color (e.g., strongest RF signal strength) for the scale of the RF color map layer 230.

In some embodiments, it may be desirable to group frames having similar s characteristics in order to identify locations for which large RF signal strength deviations are recorded. For example, in at least one embodiment, WNMS 140 can generate a graph plotting frames $x_n^i$, with the horizontal axis being $R(x_n^i)$ and the vertical axis being $S(x_n^i)$. The timestamp of each frame $x_n^i$ can also be recorded. WNMS 140 can use the graph to construct a Voronoi diagram for grouping frames having similar s characteristics.

The graph can display clusters of different UEs $t_{x^j}$, on different $A^k$, displaying similar $S(x^i)$ values for a given $R(x^i)$. On a floor of a structure having comparable conditions over $\tau_j$, it can be assumed that $t_{x^j}$ of similar characteristics should display the same RF characteristics (e.g., similar $H_{\tau_j}$).

Therefore, WNMS 140 can determine a typical $S(x^i)$ for a given $(x^i)$ within a geographic area, which can be useful as a baseline, and also to identify deviations from averages (e.g., outliers having unusual $S(x^i)$ for a given $R(x^i)$). Deviations in this relation can be traced to two possible root causes: 1) WAPs and squares displaying an unusual noise floor; or 2) $t_{x^j}$ displaying an unusual power level or transmission behavior (e.g., signal partial nulling or beamforming due to environmental or device characteristics).

Lloyd's algorithm can be modified to adapt to this graphing case and to generate clustering in which a value K can represent the number of units of R that are to be singled out. In a simple implementation case, K can be R rounded to the closest positive integer, which can be expressed using the notation as shown in Equation 11 (Eq. 11), below.

$$K = |\lfloor R \rfloor| \qquad \text{Eq. 11}$$

With a low number of sampled $t_{x^j}$ over $\tau_j$, an expression of K with reduced granularity can be used to generate the clustering in which m represents the number of frames $x_n^i$ received within $\tau_j$ for each frame $x_n^i$ having individual coordinates $(R(x_n^i), S(x_n^i))$ on the graph.

In at least one embodiment, WNMS 140 can initiate randomly K cluster centroids $\mu_{c^i} \{\mu_1, \mu_2, \ldots, \mu_k,$ where $\mu_k \in \mathbb{R}^2\}$ and can select a random number of $x_n^i$ and their associated coordinate $R(x_n^i)$ and $S(x_n^i)$ to initialize $\mu_{c^i}$.

WNMS 140 can then determine the Euclidian distance of each frame $x_n^i$ from each cluster centroid. For each frame $x_n^i$, WNMS 140 can select a cluster centroid having a smallest Euclidian distance. For example, if $c^i$ represents the index of that nearest centroid $\mu_{c^i}$, after multiple iterations WNMS 140 can determine the cluster centroid closest to each $x_n^i$. This determination translates as a minimization function as shown below in Equation 12 (Eq. 12).

$$\min_{c} \Sigma_{i=1}^{m} \|x_n^i - \mu_{c^i}\|^2 \qquad \text{Eq. 12}$$

Once each $x_n^i$ has been associated to a nearest $\mu_{c^i}$, the K cluster centroids can be moved to the geometric center of the cluster formed by their associated $x_n^i$, which can be represented as a second minimization function as shown below in Equation 13 (Eq. 13).

$$\min_{\mu} \Sigma_{i=1}^{k} \Sigma_{x \in c_i} \|x - \mu_i\|^2 \qquad \text{Eq. 13}$$

The result of the Lloyd iterative process is a standard optimal S coordinate for each R integer value for a given geographic area and standard recorded $t_{x^j}$ population over $\tau_j$. The deviation of the final $\mu_{c^i}$ can then be compared to $H_{\tau_j(x^i)}\{R(x_n^i), S(x_n^i)\}$ of each $t_{x^j}$ recorded over $\tau_j$ to determine a correction α by performing calculations using Equation 14 (Eq. 14), as shown below.

$$\alpha = \|H_{\tau j(x^i)} - \mu_c(i)\|^2 \quad \text{Eq. 14}$$

In at least one embodiment, the correction α can be coded over 8-bits to add to the RF operational characteristics of each square to provide a transparency correction to colors represented in certain squares. For example, in some embodiments, squares displaying a larger α (e.g., having larger deviations further from the average for a given geographic area) can be represented darker, with less transparency, while squares displaying a smaller α (e.g., having deviations closer to the average for the given geographic) can be displayed lighter, with more transparency. Alternatively, this correction can be used to determine a perimeter for each cluster. In other words, constraining the system to a narrow α can provide for the ability limit clusters to $t_x^j$ of very similar RF characteristics, while a larger α can provide for the ability to open each cluster to also include $t_x^j$ that display a larger range of $S(x_n^i)$ values for a given $R(x_n^i)$.

Figure 2D:
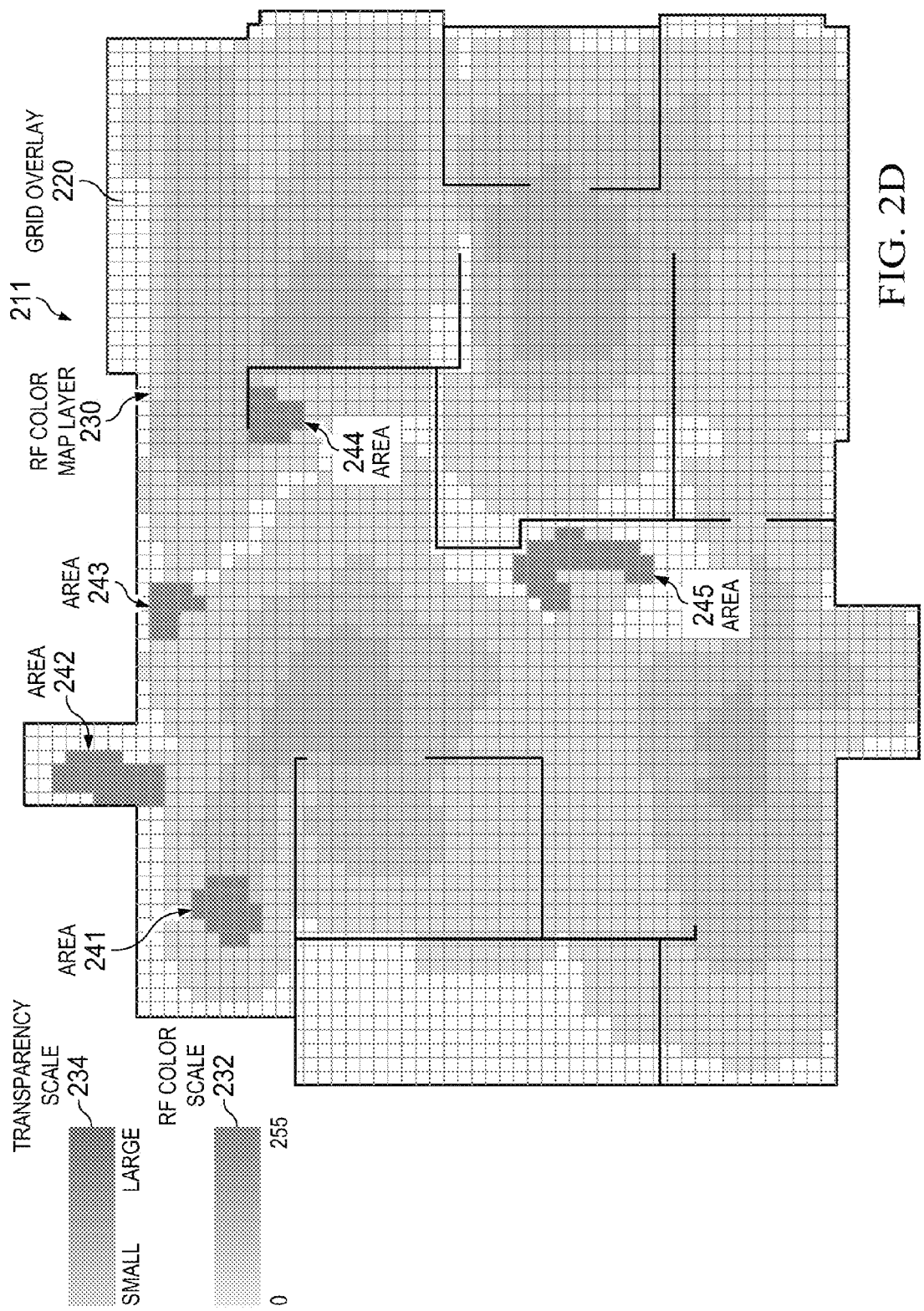

Referring to FIG. 2D, FIG. 2D is a simplified diagram illustrating example details that can be associated with an RF color map layer 240 including transparency correction features that may be generated for location map 211 for a given sampling time slice $\tau_j$ in accordance with one potential embodiment. For the embodiment of FIG. 2D, RF color map layer 240 displays RF characteristics for the location map using different colors of green. However, it should be understood that any color can be configured for an RF color map layer depending on needs and implementations and may be configured by a network administrator or the like for WNMS 140.

FIG. 2D further illustrates RF color scale 232 and a transparency scale 234 that can be used to indicate certain RF operational characteristics for the RF color map layer 240. For example, in at least one embodiment, darker (e.g., less transparent) colors can be used to indicate stronger RF signal strengths and lighter (e.g., more transparent) colors can be used to indicate weaker RF signal strengths. As shown in FIG. 2D, less transparent colors such as those shown at areas 241, 242, 243, 244, and 245 can be used to indicate larger deviations from the average noise floor in comparison to other areas of the geographic area represented by location map 211. For the embodiment of FIG. 2D, RF color scale 232 identifies colors ranging from a value of 0 for a lightest color (e.g., weakest RF signal strength) to 255 for a darkest color (e.g., highest RF signal strength) and transparency scale 234 indicates deviations from the average noise floor for the geographic area from a range of 'small' to 'large' deviations for the RF color map layer 240. However, other color and/or transparency correction associations can be envisioned depending on needs and implementations.

Transmission Color Map Layer Generation

UE $t_x^j$ detected over $\tau_j$ may be successful in their transmissions or may not be successful in their transmissions. A transmitter (e.g., a UE) can react to a transmission failure through at least two types of reactions: Type 1) by resending the failed (not acknowledged) unicast frame; and/or Type 2) by rate shifting down to use a more robust modulation. In various embodiments, a reaction of Type 1 can be detected by determining whether a frame control (FC) retry bit is set to 1 for an $x_{n+1}^i$ frame and a reaction of Type 2 can be detected by determining whether the $x_{n+1}^i$ transmission signal is at the same level as $x_n^i$ (at a given $A^k$ to which a UE is connected), but having a lower modulation. Other reactions are possible and can also be modelled depending on needs and implementations. For example, in some cases frames can be dropped, transmissions can be stopped altogether, UE can roam between APs and/or between different operating bands (e.g., between cellular and Wi-Fi). These different types of reactions can be indicative of a behavior that is referred herein as 'lower transmission ease' and, while many different reactions are possible, embodiments of WNMS 140 discussed herein consider Type 1 and Type 2 reactions for illustrating features associated with transmission color map layer generation.

Modulation is typically referred to as Modulation and Coding Scheme (MCS), which can identify a modulation type and coding scheme for the modulation type. During operation, a WAP can send WLC 122 information about the reception of frames (e.g., received modulation) and the received frames (if complete). When a frame is resent from a UE to a WAP, the WAP and the WLC can see a different modulation advertised in the frame physical header. Further, the WAP and the WLC can detect when the retry bit is set in frames received from the UE. The WNMS 140 can query WLC 122 for such frame information for sampling time slice(s).

Thus, a transmission color map layer can be overlaid over a location map alone or in combination with one or more other color maps for a given geographic area in which the transmission color map layer displays transmission ease characteristics of each square. Each square of the grid overlay for a location map can contain m transmitted frames from n $t_x^j$ over $\tau_j$. The sampling time slice $\tau_j$ can be determined so that each $\Sigma x_n^i \sigma_{\delta_n}$ remains below a low interval for the sampling period. It can be expected that each $t_x^j$ would likely use a consistent MCS over that interval; thus, a degradation of the MCS can be equated to a lowered transmission ease and increase of MCS can be equated to an improved transmission ease over the interval.

For example, let the term '$m_x^j$' represent the number of frames received for which transmission information is recorded from $t_x^j$ over $\tau_j$. The first frame $x_1^i$ for a given interval can be by used by WNMS 140 as a starting reference. For each $x_n^i$, WNMS 140, via data analysis logic 124, can compare the rate $\Phi x_n^i$ to $\Phi x_1^i$ and can store the result in an integer φ' by performing calculations based on a first system of equations as shown below such that:

$$\text{If } \Phi x_n^i = \Phi x_1^i, \text{ then } \varphi^i := \varphi^i$$

$$\text{Else if } \Phi x_n^i > \Phi x_1^i, \text{ then } \varphi^i := \varphi^i + 1$$

$$\text{Else if } \varphi x_n^i < \varphi x_1^i, \text{ then } \varphi^i := \varphi^i - 1$$

For each $x_n^i$, WNMS 140 can determine whether the FC retry bit is set and store the count, which can be represented using the term $\varphi^{ii}$, by performing further calculations based on a second system of equations such that:

$$\text{For each } x_n^i, \text{ if } FC \text{ retry}=1, \text{ then } \varphi^{ii} := \varphi^{ii} + 1$$

$$\text{Else, } \varphi^{ii} := \varphi^{ii}$$

Using the first and second system of equations, WNMS 140 can evaluate the overall ratio of frames where rate shifts were observed over $m_x^j$. Frames sent at higher rates can be identified as being representative of a higher transmission ease and frames sent at lower rates can be identified as being representative of a lower transmission ease. In at least one embodiment, the result can be coded over 4 bits using a value $\psi^i$ based on Equation 15 (Eq. 15), as shown below. In at least one embodiment, the initial value of $\psi^i$ can be set a binary '1000' (decimal 8).

$$\psi^i = \left\lfloor 8 + 8\frac{\varphi^i}{m_{x^i}} \right\rfloor \qquad \text{Eq. 15}$$

WNMS 140 can also evaluate the overall ratio of retried frames over $m_{x^i}$ and the result can be coded over 4 bits using a value $\psi^{i\prime}$ based on Equation 16 (Eq. 16), as shown below.

$$\psi^{i\prime} = -\left\lfloor 16\frac{\varphi^{i\prime}}{m_{x^i}} \right\rfloor \qquad \text{Eq. 16}$$

The values of $\psi^i$ and $\psi^{i\prime}$ can be (modulo 16) such that $\varphi^i \leq m_{x^i}$ and $\varphi^{i\prime} \leq m_{x^i}$. WNMS 140 can then calculate a final ratio of rate-shifted frames $\psi$ and retried frames $\psi'$ for all n UEs having transmitted within a given geographic area over $t_1$ as an arithmetic mean by performing calculations using Equation 17 (Eq. 17) and Equation 18 (Eq. 18), as shown below.

$$\psi = \left\lfloor \frac{1}{n}\Sigma_{i=1}^{n}\psi^i \right\rfloor \qquad \text{Eq. 17}$$

$$\psi' = \left\lfloor \frac{1}{n}\Sigma_{i=1}^{n}\psi^{i\prime} \right\rfloor \qquad \text{Eq. 18}$$

In at least one embodiment, WNMS 140 can aggregate the values of $\psi$ and $\psi'$ into an 8-bit value, which can correspond to a color of an 8-bit color scale that can be used to represent 256 different color increments of $\psi$ and $\psi'$ displayed for a transmission color map layer. In at least one embodiment, $\psi$ can be used as a 4-bit Most Significant Bit (MSB) portion of the 8-bit value and $\psi'$ can be used as a 4-bit Least Significant Bit (LSB) portion of the 8-bit value. This bit structure can be dictated by a rationale that rate shifting can represent a larger degradation or improvement of the transmission conditions than individual frame retries; however, other bit structures can be envisioned depending on needs and implementations.

Figure 2E:
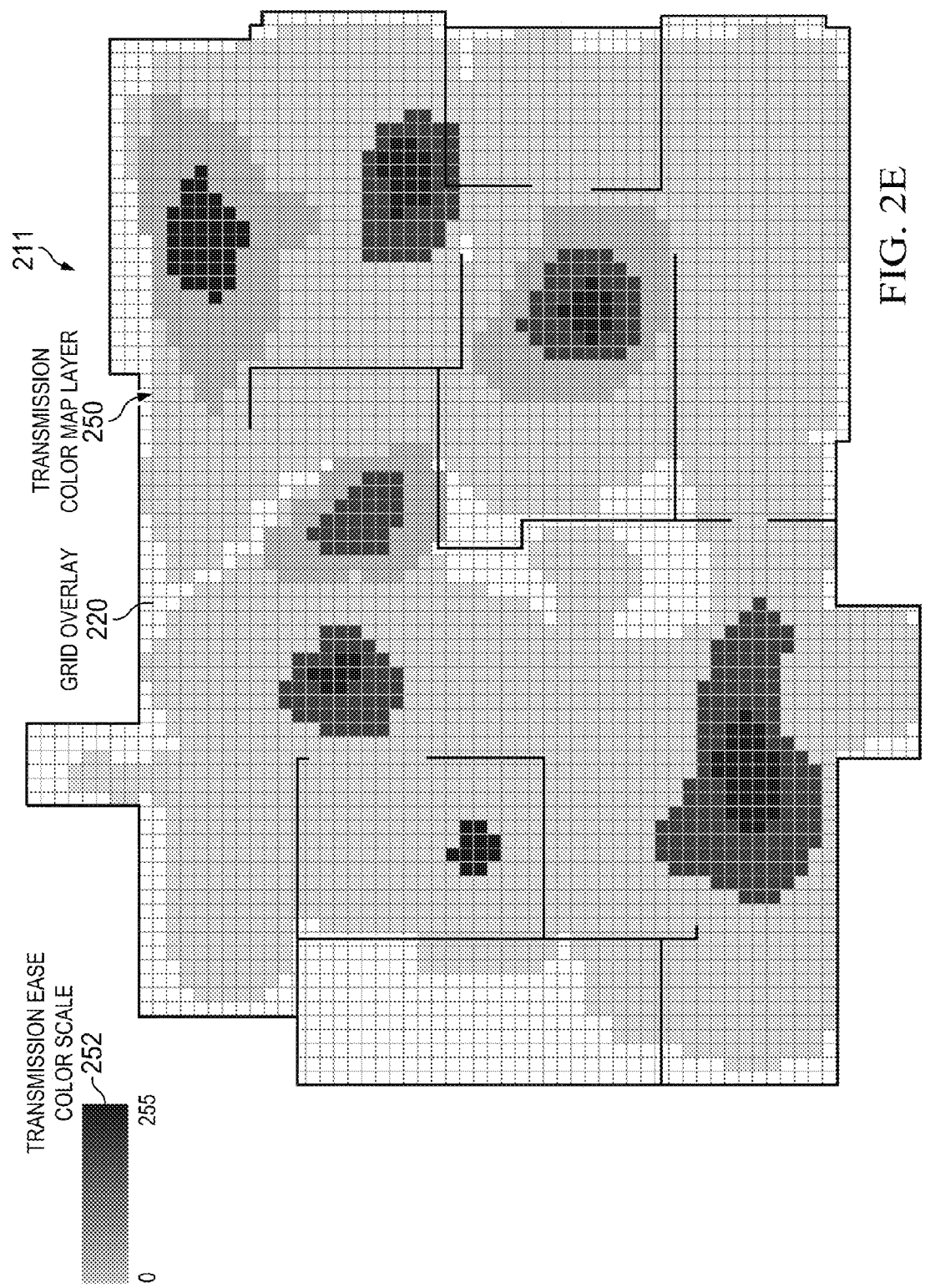

Referring to FIG. 2E, FIG. 2E is a simplified diagram illustrating example details that can be associated with a transmission color map layer 250 that may be generated for location map 211 for a given sampling time slice $\tau_j$ in accordance with one potential embodiment. For the embodiment of FIG. 2E, transmission color map layer 250 displays transmission ease characteristics for the location map using different colors of blue. However, it should be understood that any color can be configured for a transmission color map layer depending on needs and implementations and may be configured by a network administrator or the like for WNMS 140.

FIG. 2E further illustrates a transmission ease color scale 252 that can be used to indicate certain transmission operational characteristics for the transmission color map layer 250. For example, in at least one embodiment, darker colors can be used to indicate higher transmission ease and lighter colors can be used to indicate lower transmission ease. For the embodiment of FIG. 2E, transmission ease color scale 252 identifies colors ranging from a value of 0 for a lightest color (e.g., lowest transmission ease) to 255 for a darkest color (e.g., highest transmission ease) for the transmission color map layer 250. However, other color associations can be envisioned depending on needs and implementations.

In some embodiments, a time dimension may be incorporated into the color map layer generation for the transmission color map layer 250, as data rate changes and retries can be related to movement and congestion. In at least one embodiment, time vector can be used to represent the changes and retries and can be represented in a tuple as: {data rate, retries, change in data rate, change in retries, interval}. In at least one embodiment, changes in data rate and/or changes in retries can be added as a brightness or a transparency parameter for a transmission color map layer (e.g., increase in retries and decreases in data rate can both be factors resulting in darker or less transparent colors and vice-versa for decreases in retries and increases in data rate).

QoS Color Map Layer Generation

For the QoS color map layer, QoS packet markings for each UE (e.g., at each same pixel location) can be recorded for various squares of the color map layer. Access to a medium (e.g., an RF channel, frequency, etc.) can be determined by WNMS 140, via data analysis logic 142, based on the arbitration method used by each $t_{x^i}$. In at least one embodiment, network level data associated with network level communications for the geographic area represented by a location map can be gathered by WNMS 140 via data collection logic 144 using network telemetry processes, packet sniffing processes, combinations thereof, or the like.

UEs having QoS traffic can be provided a statistical advantage over non-QoS UEs, and each QoS UE's flow user priority (UP) can be used to provide a different statistical advantage. As such, a QoS color map layer can be generated that displays the transmit (Tx) and receive (Rx) statistical advantage of each $t_{x^i}$. Several parameters can be accounted for including, but not limited to:

1) A UP value, which can be represented using the term '$v_{ux_n}^i$' that indicates upstream frames (from $t_{x^i}$ to $A^k$), which in some embodiments can also include Tunnel Direct Link Setup (TDLS) frames, and can be expressed based on the relationship as shown in Equation 19 (Eq. 19), as shown below.

$$0 \leq v_{ux_n}^i \leq 7 \qquad \text{Eq. 19}$$

2) A UP value, which can be represented using the term '$v_{ux_n}^i$' that indicates downstream frames (from $t_{x^i}$ to $A^k$) and can be expressing based on the relationship shown in Equation 20 (Eq. 20), as shown below.

$$0 \leq v_{ux_n}^i \leq 7 \qquad \text{Eq. 20}$$

In at least one embodiment, a weight coefficient $w_{x_n}^i$ can be applied to each $x_n^i$ based on its duration (e.g., in units of one hundred microseconds) based on a rationale that the statistical gain can be linearly related to the transmission duration. Additionally, longer transmissions face more risks of failure than shorter transmissions. Note that the frame length is incorporated into the duration, as the duration is a factor or frame length and transmission rate. As a consequence, the transmission rate is also factored into the duration element. Please also note that the FC retry bit can be ignored, for two reasons: 1) the FC retry bit can be included in the transmission ease factor, which can be merged with the QoS color map to generate a combined color map; and 2) including the FC retry bit could artificially increase the importance of this bit in an overall QoS color map displayed.

Unless a retry is sent with a different UP than the initial transmission (which is extremely uncommon, as the retry function is a lower level function of the driver), the statistical advantage is likely the same between the initial transmission and its retransmission. For each UE transmitting and receiving m frames over the interval $\tau_j$, WNMS 140, via data analysis logic 142, can compute a statistical advantage score, which can be represented using the term '$Ax^i$', by performing calculations based on Equation 21 (Eq. 21), as shown below.

$$Ax^i = \Sum_{n=1}^{m}((v_{ux_n}{}^i w_{x_n}{}^i) + (v_{dx_n}{}^i w_{x_n}{}^i)) \qquad \text{Eq. 21}$$

In at least one embodiment, WNMS 140 can normalize $Ax^i$ over 255 by performing calculations based on Equation 21 (Eq. 21), as shown below.

$$Ax^i := 255 \frac{Ax^i}{7\tau_j} \qquad \text{Eq. 22}$$

For Eq. 22, $\tau_j$ can also expressed in units of 100 microseconds. In at least one embodiment, a $t_{x^j}$ transmitting a single frame of UP 7 for the entire duration of $\tau_j$ can be assigned a score of 255 and a $t_{x^j}$ not transmitting during $\tau_j$ can be assigned a score of 0 by WNMS 140.

Using values of $Ax^i$, WNMS 140 can generate a QoS color map layer in which $Ax^i$ is displayed at the geographical coordinate $g(x^i) = \{X(x^i), Y(x)^i\}$ of each $t_{x^j}$. Although a $t_{x^j}$ may be located at a single geographical coordinate location for the duration of $\tau_j$, it may be visually convenient to increase the value of neighboring pixels to that of $Ax^i$ so as to improve the visibility of the QoS color map layer.

Figure 2F:
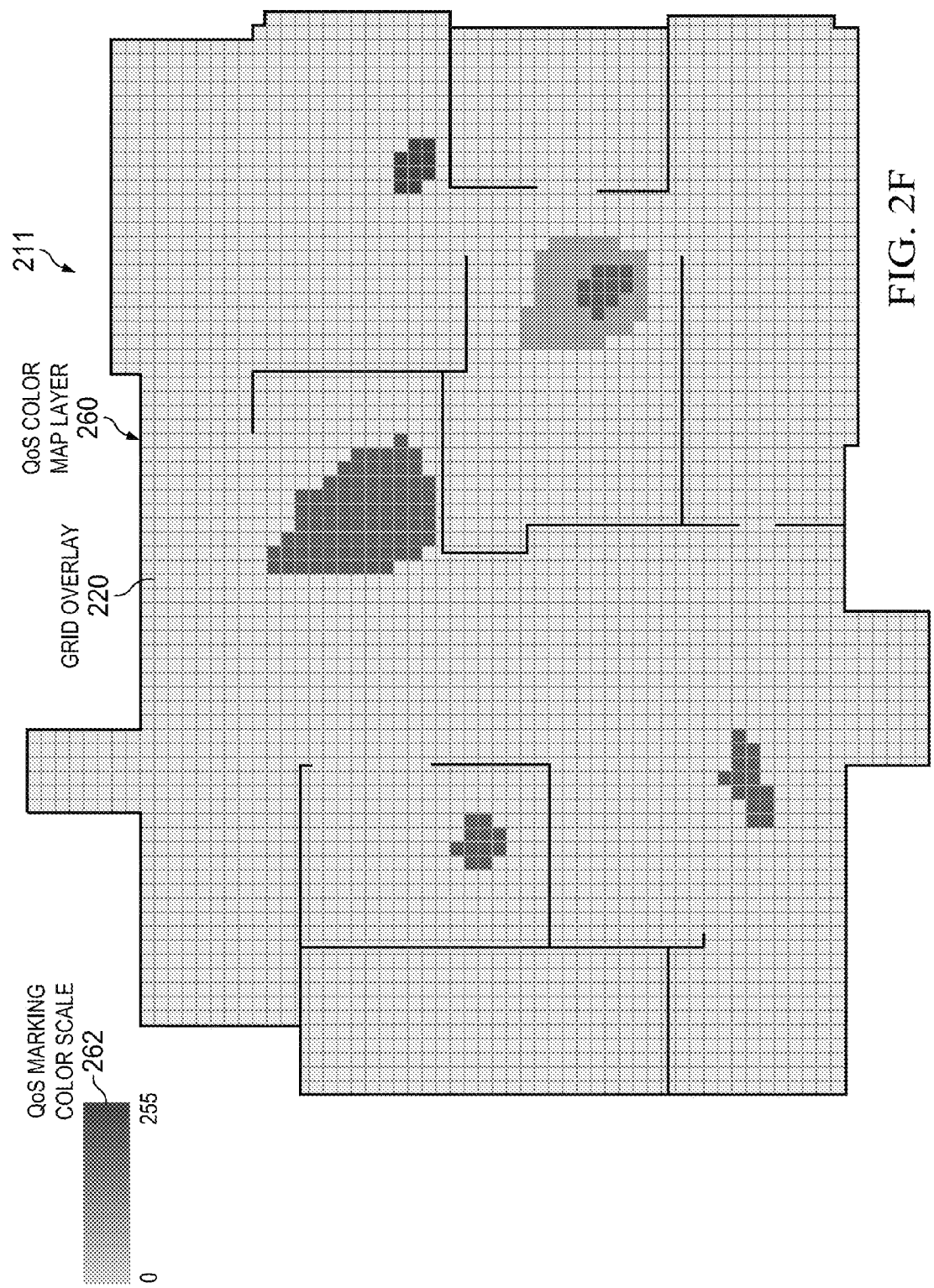

Referring to FIG. 2F, FIG. 2F is a simplified diagram illustrating example details that can be associated with a QoS color map layer 260 that may be generated for location map 211 for a given sampling time slice $\tau_j$ in accordance with one potential embodiment. For the embodiment of FIG. 2F, QoS color map layer 260 displays QoS marking information for the location map using different colors of red. However, it should be understood that any color can be configured for an RF color map layer depending on needs and implementations and may be configured by a network administrator or the like for WNMS 140.

FIG. 2F further illustrates a QoS marking color scale 262 that can be used to indicate certain QoS operational characteristics for the QoS color map layer 260. For example, in at least one embodiment, darker colors can be used to indicate a higher number of UP packets being communicated for a given region (e.g., a square) and lighter colors can be used to indicate a lower number UP packets being communicated for given region. For the embodiment of FIG. 2F, QoS marking color scale 262 identifies colors ranging from a value of 0 for a lightest color (e.g., lowest number of UP packets) to 255 for a darkest color (e.g., highest number of UP packets) for the QoS color map layer 260. However, other color associations can be envisioned depending on needs and implementations.

In at least one embodiment, a time vector can be set for the same interval as the transmission color map layer, which can be represented in a tuple as: {frame count up, frame count down, Layer 2 (L2) QoS up, Layer 3 (L3) QoS up, L2 QoS down, L3 QoS down, interval}. In at least one embodiment, a proportion of marked traffic can be reflected in a color brightness and/or transparency correction for the QoS color map layer (e.g., a UE with Upstream and Downstream Differentiated Services Code Point/UP (DSCP/UP) for all traffic can have a brighter or less transparent associated color than a UE only partially marking QoS [e.g., partially in terms of applications/Layer/direction]).

Combined Color Map Generation

Once the color map layers (e.g., RF color map layer, transmission color map layer, and QoS map layer, any of which may or may not include brightness or transparency correction features integrated therein) are generated, the color map layers can be merged into an N-bit combined color map of the geographic area represented by location map 211. In various embodiments, N can be 24, 32, 64, or any other value as may be determined according to needs and implementations. In some embodiments, left or right bit shifting operations can be performed to change the N-bit scale accordingly. During operation, one or more color map layers can be activated or deactivated by a human operator (e.g., human operator 130 via display 128 and compute node 126) in order to display different color map overlays for a given geographic area represented by a location map.

For purposes of illustrating various features that may be associated with WNMS 140, example discussions provided herein will reference a 32-bit combined color map that displays a combination of three (3) colors including green plus transparency correction, blue, and red (e.g., 16+8+8) for the geographic area represented by location map 211. Experimental results have indicated that applying transparency only to the RF component is sufficient to contrast clustered versus outlier $t_{x^j}$ in a representation that is intuitive enough for a network administrator to evaluate.

In some embodiments, as color map layers are recorded over multiple sampling time slices $\tau_j$, UE characteristics (e.g., hardware and/or software) and location factors (e.g., it may be possible that multiple UE can be in a single square, depending on square size) can be smoothed through addition of a soft loss layer. In one embodiment, devices displaying similar RF and transmission colors can be grouped to reduce the number of colors per pixel beyond the learning phase. Standard methods can be used to ignore individual deviations. In some embodiments, a similar grouping technique can be added to the processing to decrease the number of pixels on a map. Grouping using methods such as max pooling or the like can be used to group pixels of similar colors for a given UE category. The result can be a multilayer floor map with pixels displaying colors per UE type: (1) RF characteristic color, (2) transmission ease color, and (3) QoS marking color. Although these three color map layers are discussed herein, it should be understood that any number and type of color map layers could be utilized by a WNMS to illustrate any operational characteristics of a WLAN as may be desired by a human operator for a given deployment within the scope of the teachings of the present disclosure.

The resulting combined color map can be used as a representation of the state of each UE for the geographic area represented by the location map. By using a different color for each family of parameters, a human operator can intuitively identify areas or $t_{x^j}$ of concern. Degradation can be expected to be linear as distance from each WAP increases, resulting in a corresponding linear darkening of each color component. Areas and $t_{x^j}$ displaying an abnormal color structure can easily be identified and tracked for further analysis. In at least one embodiment, color deviations displayed on color maps can be considered a multilayer heat map displaying key network performance indicators that can enable a human operator to determine which component(s) should be tracked. In some embodiments, weighting can be used to determine which factors should be considered, which can provide a powerful visualization and troubleshooting tool for human operators.

Figure 2G:

Referring to FIG. 2G, FIG. 2G is a simplified diagram illustrating example details that can be associated with a combined color map 270 that may be generated for location map 211 for a given sampling time slice $\tau_j$ in accordance with one potential embodiment. For the embodiment of FIG.

2G, the combined color map 270 displays a combination of colors from example color map layers shown in FIG. 2D (RF color map layer with transparency correction), FIG. 2E (transmission color map layer), and FIG. 2F (QoS color map layer). FIG. 2G further illustrates an operational characteristics color scale 262 that can be used to indicate operational characteristics of the geographic area represented by the location map. Thus, FIG. 2G can display a multilayer heat map that can enable a human operator to view and/or manage operation of the WLAN 110 for the geographic area represented by the location map 211. During operation, a human operator (e.g., human operator 130 via compute node 126 and display 128) can dynamically select one or more color map layers to activate or deactivate for a combined color map in order to view different operational characteristics for a given geographic area represented by a location map. In some embodiments, color scales associated with each color map layer can also be displayed for a combined color map in which the color scale(s) associated with a given color map layer can be displayed or not displayed based on whether the given color map layer is being activated or deactivated by a human operator.

As discussed for various embodiments described herein, it should be understood that brightness and/or transparency correction can be provided for any color map layer and/or combined color maps for location maps. Virtually any combination of colors, including grayscales, and color map layers having or not having brightness and/or transparency correction applied thereto can be generated and/or combined to generate a combined color map, which may or may not also have brightness and/or transparency correction applied thereto, can be used to illustrate operational characteristics of a WLAN and, thus, are clearly within the scope of the teachings of the present disclosure.

Statistical Modeling Using a Convolutional Neural Network

Beyond providing a powerful visualization and troubleshooting tool for human operators, WNMS 140 can also provide for the ability to troubleshoot and predict application performance and QoE through statistical modeling using convolutional neural network processing.

In at least one embodiment during operation, application scores for a particular application (e.g., a MOS value for a Voice and/or Video application) can be retrieved (e.g., from application server(s) 152) for UE targets (e.g., UEs 214) within a given geographic area (e.g., location map 211) that source application traffic for the particular application. The application score is known and is an external measurement of the application health (e.g., the K-Factor value for low MOS can be retrieved from a call control agent such as Cisco's Unified Communications Server or Skype for Business Server).

Using application scores retrieved for each UE and combined color maps for one or more measurement intervals $\tau_j$, a learning phase can be initiated to train a predictive statistical model. A product of the learning phase can result in the generation of a single, fully connected coloration map that can be used to predict applications scores and/or pinpoint potential issues with the WLAN that may be causing poor observed scores.

In some embodiments, once a combined color map is generated for each $\tau_j$, each pixel/square value may be averaged over $\tau_j$, to represent operational characteristics over a larger period of time for a potentially larger quantity of $t_{x^j}$ in each square. Individual $t_{x^j}$ sampling can result in sharp contrasts being displayed between any of: squares where $t_{x^j}$ have been detected and empty squares over some $\tau_j$ and/or between data collected from $t_{x^j}$ in difficult areas and neighboring $t_{x^j}$ in more favorable areas. Yet, it is unlikely that RF changes dramatically at the edge of a particular square/pixel, which merely represents a virtual division of a geographic area. Thus, it may be desirable to smooth the edges of pixels/squares for display purposes.

In at least one embodiment, single layer convolutional Gaussian smoothing can be used to smooth areas of sharp contrast for a color map. Convolutional Gaussian smoothing can involve calculations using a 2-D (e.g., circularly symmetric) Gaussian transform of a type as shown in Equation 23 (Eq. 23), below.

$$G(x, y) = \frac{1}{2\pi\sigma^2} e^{-\frac{x^2+y^2}{2\sigma^2}} \qquad \text{Eq. 23}$$

For Eq. 23, 6 can represent the standard deviation and $\sigma^2$ can represent the variance. The parameter 6 can be set to 1 in at least one embodiment. However, the kernel size and the variance can be varied based on the desired granularity of a color map and the number of sampled $t_{x^j}$ over $\tau_j$. An example Gaussian kernel of size 5 displays a smoothing structure as shown in TABLE 1, below.

TABLE 1

EXAMPLE GAUSSIAN SMOOTHING KERNEL

| 0.003765 | 0.015019 | 0.023792 | 0.015019 | 0.003765 |
|---|---|---|---|---|
| 0.015019 | 0.059912 | 0.094907 | 0.059912 | 0.015019 |
| 0.023792 | 0.094907 | 0.150342 | 0.094907 | 0.023792 |
| 0.015019 | 0.059912 | 0.094907 | 0.059912 | 0.015019 |
| 0.003765 | 0.015019 | 0.023792 | 0.015019 | 0.003765 |

In at least one embodiment, applying a kernel as shown in TABLE 1 through convolution operations to each square of a color map can attenuate pixel/square edges and can transform a discrete collection of individual data into a zone-based color map with softer boundaries between zones. In some embodiments, anomalies (e.g., low call scores for a particular color combination that should normally map to a high score) can be either discarded or labeled as a 'non-WLAN issue'.

A combined color map, which may or may not be smoothed, can be considered as an image of dimensions including Width×Height×Depth (W×H×D). Depending on the resolution needed, a unit of Width and Height can either be a pixel or a square (e.g., of a grid overlay). Using a square as the minimal unit offers a lower resolution but faster calculation and can be adapted to light systems (e.g., distributed edge computing systems) while a pixel resolution may be more adapted to centralized computing systems. The choice of the unit may not influence the general processing operations described herein and can be selected depending on needs and implementations in accordance with various embodiments.

If three color map layers are used (e.g., RF, transmission, and QoS), then D can be equal to 3 (D=3). Optionally, RF transparency correction can be added as $4^{th}$ dimension in which case D can be equal to 4 (D=4). A combined color map can represent an input Layer of a convolutional neural network, which, in combination with application scores retrieved from a real-time application server (e.g., an application server 152) for $t_{x^j}$ using real time applications for a given sampling time slice $\tau_j$, can be used to train the convolutional neural network statistical model. Prior to statistical modelling, the color map can be a color coding reflecting three (or four, depending on implementation) operational characteristics of UEs across the geographic area represented by the location map 211.

Sampling $x^i$ over multiple $\tau_j$ by WNMS 140 will provide an average representation of the operational characteristics but it will not link the operational characteristics together (e.g., it will not express which combination of RF map, transmission ease and QoS may be translated into a higher or lower application QoE) for users at different locations of the location map 211. Additionally, for an RF noise floor, there can be proximity and correlation between the operational characteristics of a given location and the operational characteristics of the pixel adjacent to that location.

Convolutional neural network models can provide a powerful tool to expedite the learning process for WNMS 140 as individual treatment of each pixel can be shortened by filtering regions, sometimes referred to as 'receptive fields', of several pixels. In general, convolutional neural network modelling operations involve of an input image, typically referred to as 'input neurons', to which one or several convolutions are applied using one or several kernels or filters, which can make up convolutional layers of a convolutional neural network. For D=3, input neurons can be the WLAN data including RF data, transmission data, and QoS marking data gathered for a particular geographic region represented by a given location map.

In at least one embodiment, a convolutional neural network statistical model provisioned for WNMS 140 can be provisioned to use eight (8) filters. Thus, the convolutional neural network statistical model can include 8 convolutional layers. As referred to herein, the terms 'convolutional layer' and 'filter' can be used interchangeably in reference to convolutional neural network statistical modeling. The number of filters can be increased or decreased. Determination of the most efficient number of filters to use that may ensure the highest correlation of success between predicting an application score based on characteristics represented by a colored map can be iterative. In various embodiments, the number of filters can be changed based on operating conditions, geographic area, implementations, needs, combinations thereof, or the like. Experimental results indicate that 8 filters with a 3×3 kernel structure or 8 filters with a 5×5 kernel structure can provide a high success rate for predicting application scores. For purposes of illustrating various example operations discussed herein, a 3×3 structure may be assumed.

Filtering an image (e.g., a color map) can include moving a filtering structure (e.g., a kernel) structure across the image using a predetermined stride for each filtering operation. For embodiments discussed herein, a stride of one (1) pixel is assumed; however, other strides can be provisioned depending on needs and implementations. As the filtering progresses across the image at a stride of 1 pixel, zero padding can be provided at the edges to ensure that an output image (e.g., the result of the filtering for a convolutional layer) has the same dimension as an input image. The amount of zero padding at a border in any dimension depends on the stride and filter size. For a stride of 1 pixel, the amount of zero padding can be determined using Equation 24, as shown below.

$$p = \frac{F-1}{2} \quad \text{Eq. 24}$$

For Eq. 24, F can represent the filter size (e.g., 3, 5, etc.) and p can represent the amount of zero padding needed for a border.

One principle of convolution is to reuse parameters so as to reduce calculation complexity. At each layer, each neuron of the convolutional neural network can receive one or more input x having a weight w, including a bias (b) $w_0$ of weight 1 such that a neuron activation function can be used to generate a result for an axon $a_j$ having a form as shown below in Equation 25 (Eq. 25).

$$a_j = f(\Sigma_i w_i x_i + b) \quad \text{Eq. 25}$$

For example, for an input color map having D=3, Eq. 25 can be represented as $a_j = f((w_1 x_1 + w_2 x_2 + w_3 x_3) + b)$. The combination of axons resulting from application of a given filter at a given convolutional layer to a receptive field is referred to as a 'feature map'. The value of the filter bits (e.g., weights) for each convolutional layer can be determined through the learning phase. For example, in one embodiment, initial values of the filter bits for each convolutional layer can be randomly chosen and can be updated during training or re-training for the statistical model. In some embodiments, a rectification phase can be added to the processing to discard any negative outputs that may result following the filtering performed for a particular convolutional layer.

In various embodiments, different non-linearity functions f can be provisioned for the statistical modeling performed by WNMS 140 including, but not limited to tan h functions, sigmoid functions, Rectified Linear Unit (ReLu) functions, or the like. In at least one embodiment, a tan h non-linearity function can be provisioned for WNMS 140, as the tan h function can exhibit certain processing efficiencies in comparison to other function types for processing color maps of a WLAN. As a result, the $k^{th}$ feature map $h^k$ at a given layer for which filters are determined with weights $w_k$ and bias $b_k$, at location (i, j) can be calculated by WNMS 140 by performing calculations as illustrated by Equation 26 (Eq. 26), below.

$$h = \tan h((w_k x) i_j + b_k) \quad \text{Eq. 26}$$

As a resulting feature map for a convolutional layer is likely to be large in terms of pixels, spatial pooling can be performed in at least one embodiment following a rectification phase for a convolutional layer in order to reduce the dimensionality of the feature map while retaining critical information for the map. In various embodiments, 'critical information' can be considered values calculated for certain squares that exhibit a greater deviation (e.g., more significant) in comparison to adjacent squares exhibiting lesser deviations (e.g., less significant).

In at least one embodiment, WNMS 140 can perform spatial pooling by performing max pooling operations. Over a pooling region $R_j$ and a set of activation functions $\{a_1, \ldots, a_{|R_j|}\} \in R_j$, max pooling $m_j$ calculations can be performed using Equation 27 (Eq. 27), as shown below.

$$m_j = \max_{i \in R_j} a_i \quad \text{Eq. 27}$$

Max pooling can sometimes overfit data. Thus, in various embodiments, other pooling functions can be provisioned for WNMS 140 including, but not limited to, stochastic pooling, $l_p$ pooling, or the like depending on needs and implementations.

The output feature map from the last convolutional layer for a convolutional neural network statistical model can represent a fully connected layer in that the each respective neuron from a previous convolutional layer connects to each respective neuron for the last layer in a mesh fashion. For intermediate convolutional layers, some neurons may interconnect between convolutional layers and some may not; however, for the last convolutional layer all neurons from the previous convolutional layer will input into each neuron of the last convolutional layer.

During the learning phase, the output is trained against a real-time observed application score (e.g., MoS, etc. gathered from application server(s) 152) for one or several $x_n^i$ frames having a same score and $H_{\delta(x_n^i)}$ within the similar region (e.g., a square) determined for the sampling time slice $\tau_j$. In some embodiments, the statistical model can be trained with a grouping around a number of application score classes. For example, under an assumption of a maximum possible MoS of 5.0, eight (8) MoS (e.g., application score) classes can be provisioned for WNMS 140 (e.g., by a human operator) for training the statistical model such as, for example:

Class 1: 4.1≤MoS
Class 2: 3.9≤MoS<4.1
Class 3: 3.7≤MoS<3.9
Class 4: 3.5≤MoS<3.7
Class 5: 3.3≤MoS<3.5
Class 6: 3.1≤MoS<3.3
Class 7: 2.9≤MoS<3.1
Class 8: MoS<2.9

Application score classes can be characterized by one or more class threshold values that can identify an upper and/or a lower threshold bound for each class. Although eight classes are illustrated for the example above, any number of application score classes can be provisioned for the learning phase of statistical model training and/or re-training in accordance with various embodiments.

Training the statistical model using a number of application score classes can provide for the ability to improve processing efficiency for WNMS 140 during the learning phase. For example, training a statistical model for every application score value, which could include multiple degrees of precision that could extend from the tenths, hundredths, thousandths, etc. (e.g., 1, 1.0, 1.00, etc.) that might be possible for UE applications can be computationally expensive and/or can impact the training time for the model. By grouping application scores into a number of classes, processing efficiencies can be realized for the system and method provided by communication system 100. Training a statistical model for ranges of scores across a number of classes as opposed to training for each possible score and degree of precision can decrease computational costs and/or training time for WNSM 140. Depending on the granularity of application score classes, it may be possible to have different combinations of different operational characteristics (e.g., different combinations of weights) that may impact scores within a single class. Thus, in at least one embodiment, WNMS 140 can be provisioned to identify a number of potentially different combination(s) of operational characteristics that might impact a range of possible application scores for each of multiple application score classes that can be configured for the WNMS. In at least one embodiment, identifying multiple combinations of characteristics that might impact application scores for a number of application score classes can be used by WNMS to identify operational trends for a given geographic area (e.g., to identify likely characteristics that might impact certain classes, to identify characteristics that might be more likely to occur near certain threshold bounds of application score classes, etc.).

In at least one embodiment, the number of application score classes that WNMS 140 is to use for training a statistical model can be configured by a human operator (e.g., human operator 130). In some embodiments, a human operator can identify a range of application scores that may be possible for a given geographic area, can identify a desired degree of precision and classes based on the application scores, and can configure the classes for WNMS 140 to use during the learning phase. In still some embodiments, WNMS 140 can be configured to determine a number of application score classes automatically based on any combination of: a range of application scores gathered for a given geographic area represented by a given location map; a degree of precision of the application scores; a degree of precision and or a number of application score classes configured by a human operator; and/or hardware, storage, and/or software limitations (e.g., memory space, storage space, processing speed, etc.) for WNMS 140 or some other system element; or the like. In still some embodiments, the number of application score classes can be changed during operation depending on needs and implementations.

Backpropagation, also referred to herein as 'backward propagation', can be used to train a statistical model and make the neurons compute the gradient for their weights. For the convolutional layers of a statistical model, back propagation is a form of processing which seeks to at minimize a cost function between a calculated application score of a given region $R_{(i,j)}$ and the effective or observed application score recorded for the region through real-time application scoring for a given $x_n^i$ or group of $x_n^i$. The cost function can represents the difference between the measured application scores and the application scores calculated across the convolutional layers of the statistical model.

As forward convolution is performed several times for the statistical model, the calculated activation function $a_j$ for the $l^{th}$ iteration (e.g., convolutional layer), $a_j^{(l)}$, can display an error $\delta_j^{(l)}$, compared to the optimal activation value based on a given reference $x_n^i$ (e.g., for which real-time application scoring was gathered via an external real-time application server). In other words, $\delta_j^{(l)}$ for the last (fully connected) Layer can be calculated by WNMS 140 using Equation 28 (Eq. 28), as shown below.

$$\delta_j^{(l)} = a_j^{(l)} - y_j \qquad \text{Eq. 28}$$

For Eq. 28, the term '$y_j$' can represent the measured application score value for a given reference $x_n^i$ and the term 'l' can represent a given layer (e.g., the last layer). A vectorized expression of Eq. 28 can be represented as shown in Equation 29 (Eq. 29), below.

$$\delta^{(l)} = a^{(l)} - y \qquad \text{Eq. 29}$$

By performing gradient descent searching across the layers of the statistical model, WNMS 140 can evaluate $\delta^{(l)}$ for each layer, going backward from the output Layer toward the input layer in order to iteratively minimize $\delta^{(l)}$ for all layers of the statistical model until a predetermined error criterion is met. The $\delta^{(l)}$ can be minimized using gradient descent searching by adjusting the weights for convolutional layers of the statistical model in an iterative manner to determine the optimal combination of weights across all layers that results in a minimized $\delta^{(l)}$ at the output layer.

Accordingly, combined color maps can be used by WNMS 140 to observe and/or identify linking relationships between specific RF color(s), transmission color(s), QoS color(s) and application score range association(s) that can enable WNMS 140 to predict applications score(s) (e.g., MoS value(s)) for one or more location(s) for one or more application(s) and/or HW/SW UE type(s) that may be operating within a given geographic area represented by a given location map. For example, during operation WNMS 140 can gather WLAN data (e.g., RF data, transmission data, QoS marking data) for one or more region(s) (e.g., square(s)) of a location map and can apply the WLAN data to a trained statistical model by performing calculations across all of the convolutional layers using the WLAN data to calculate a predicted application score for each of the one or more regions.

In at least one embodiment, an observed application score for a particular region (e.g., a square) and a predicted applications score value calculated for the particular region can be displayed on an application quality map layer that may be overlaid a location map with or without additional color map layers that may be activated for the location map. In some embodiments, the statistical model can be re-trained based on a determination that a difference between a predicted application score and an observed application score exceeds a particular error threshold, which can be varied or the same for different application score classes. In such embodiments, the observed score and WLAN data gathered for the sampling time slice can be used to re-train the statistical model.

As WNMS 140 learns linking relationships and the statistical model is trained to meet a certain error criterion, combined color maps can also be used in reverse. For example, when a low application score is recorded for a given region, the WNMS 140 can determine an issue that may have caused the low application score by identifying the application score class to which the recorded application score belongs (e.g., performing a comparison between the recorded application score and each of a number of possible application score classes); and, once the application score class is identified, weights and/or weight combinations for one or more neurons (e.g., RF, transmission, QoS, etc.) of one or more convolutional layer(s) and/or one or more application score class(es) can be identified as contributing factors to low application scores (e.g., larger weights can be identified as having a greater impact and vice-versa).

Applying convolutional techniques to WLAN data through convolutional neural network statistical modeling enables WNMS 140 to refine the evaluation and impact of each observed parameter (e.g., RF, transmission, QoS, etc.) on an application score and to identify statistically high contributing factors to poor application QoE. Accordingly, the system and method provided by communication system 100 can provide a closed-loop method for troubleshooting and predicting application performance and QoE for a geographic area of a given WLAN in which application scores, being a measured, fixed point for a given location, can be compared to observed WLAN characteristics while an application is operating (e.g., a call is being placed, etc.) for one or more UE in the geographic area. Machine learning techniques are used by WNMS 140 to ascertain which WLAN parameters can impact application scores for a given location (e.g., square). As different application scores are observed or identified throughout a WLAN in different locations, WNMS 140 can learn what operational characteristics impact application score changes by observing an entire WLAN parameter set.

As more and more application calls or, more generally, flows generating data packets, are made to the network, WLAN parameters affecting application scores in each location can be understood by WNMS 140 through ML and can, in turn, be manipulated to improve application scores in a control loop. During this control loop, application scores can be continually observed until they are optimized by manipulating WLAN parameters where needed.

Further, the system and method provided by communication system 100 provides for the ability to optimize machine learning efficiency by grouping observed categories/parameters in a fashion unique to WLAN issues; thus, providing for the ability to avoid 1-dimension limitations and N-dimension complexity. For WNMS 140, parameters can be grouped in an N-dimensional space in which each sub-parameter can influence its own group weight and each group can influence cell conditioning readings. Using the N-dimensional grouping, enables each dimension to be visualized as contributing or not contributing to application and/or call quality, while also letting each internal parameter be evaluated as may be needed. This provides a complete view of a WLAN and enables processing efficiencies to be realized in the learning and display processes.

The manner in which WNMS 140 applies machine learning and convolutional techniques to develop the coloration map is also unique. There may be too many WLAN parameters present for a given area that may impact application scores for basic correlation techniques to be used effectively by a human operator. To simplify this problem, the solution provided by communication system 100 provides for the ability to apply operational characteristics across a number of convolutional layers in order to determine how each of the operational characteristic may impact application scores. This enables the system to provide a much quicker and refined approach to understanding what parameter(s) are impacting application and/or call quality, which, in at least one embodiment, enables WNMS 140 to display each operational characteristics for a number of color map layers on a combined color map so that a human operator can visually interpret relationships that may exist between application score and various WLAN operational characteristics such as RF characteristics, transmission characteristics, QoS marking characteristics, or other operational characteristics that may be measured for a WLAN.

Accordingly, communication system 100 can provide an intuitive translation of cell conditions into color codes and also the translation of each dimension into a color component. This visual representation creates an intuitive tool that can be used to learn and display contributing factors using color maps. This can be extremely appealing to WLAN administrators, as it allows a clear understanding of how the N-dimensions can affect application performance (e.g., application scores) on a physical location map. The system and method provided by communication system 100 provides for the ability to use a full color palette, including brightness and transparency, to express influences of multiple contributing factors along with the density of contributing measurements.

Referring to FIG. 3, FIG. 3 is a simplified flow diagram illustrating example operations 300 that can be associated with generating color map layers according one embodiment of the present disclosure. In at least one embodiment, operations 300 can be performed using a WNMS (e.g., WNMS 140) based on WLAN data gathered for a particular geographic area represented by a given location map for a WLAN (e.g., location map 111 for WLAN 110).

At 302, the operations can include the WNMS gathering WLAN data for the particular geographic area of the WLAN represented by the location map. The WLAN data can include RF data, transmission data, and QoS marking data gathered for the WLAN for a particular sampling time slice determined by the WNMS as discussed for various embodiments described herein. At 304, the operations can include the WNMS applying a grid overlay to the geographic area represented by the location map. The grid overlay can be represented by a plurality of same-sized regions (e.g., squares, etc.) applied to the geographic area represented by the location map that can provide for the ability to identify locations of the geographic area at which one or more UE may be operating (e.g., using Cartesian coordinates) and/or at which one or more WAPs may be located.

The WNMS can perform a set of per-layer operations (310) for each of one or more color map layers provisioned for the WNMS. In at least one embodiment, the number and type of color map layers (e.g., RF with or without transparency correction, transmission, QoS, etc.) and the WLAN data needed for each layer can be provisioned for the WNMS by a human operator (e.g., human operator 130 via compute node 126). At 312, the operations can include the WNMS calculating a color map value for each region of the grid overlay for a given color map layer. The calculations performed for each color map layer can be performed as discussed for various embodiments described herein for a particular sampling time slice.

At 314, the operations can include the WNMS scaling the calculated color map values for the color map layer to a color scale (e.g., 8-bit, etc.) provisioned for the color map layer, assigning (316) each color map value to a color code identified by the color map scale, and generating (318) the color map layer that identifies a corresponding color for one or more region(s) of the color map layer. In some cases, no activity may be detected for one or more region(s), in which cases the regions may be uncolored or may be assigned a color corresponding to a zero (0) color value for a given color map layer.

Upon generating all color map layers provisioned for the WNMS, the WNMS can generate (320) a combined color map using each of the color map layers in which the combined color map identifies a combination of each corresponding color for each of one or more region(s) of the color map and the operations can return to 302 at which additional data can be gathered for the WLAN and the operations can be repeated. In some embodiments, the combined color map and/or one or more of the individual color map layers can be displayed (322) on a display for a given computer node (e.g., displayed on display 128 of compute node 126) and the operations can return to 302 at which additional data can be gathered for the WLAN and the operations can be repeated and/or can be used as an input (324) for a statistical model (e.g., to train the statistical model and/or predict an application score for one or more UE for one or more region(s) of the geographic area) and the operations can return to 302 at which additional data can be gathered for the WLAN and the operations can be repeated.

Referring to FIG. 4, FIG. 4 is a simplified flow diagram illustrating example operations 400 that can be associated with predicting an application score for a UE according to one potential embodiment of the present disclosure. In at least one embodiment, operations 400 can be performed using a WNMS (e.g., WNMS 140) based on WLAN data associated with a particular geographic area represented by a given location map for a WLAN (e.g., location map 111 for WLAN 110).

Prior to performing operations associated with predicting an application score for a UE, operations 400 can include training (402) a statistical model representing linking relationships for the WLAN (e.g., relationships linking RF operational characteristics, transmission operational characteristics, and QoS operational characteristics to application scores and/or application score classes) using combined color maps generated for the particular geographic area represented by the location map using historical WLAN data gathered for the particular geographic area of the WLAN over one or more sampling time slices. The statistical model can be trained until an error criterion, as may be provisioned for the WNMS by a human operator, is met.

Following training of the statistical model, the model can be used to predict application scores using current WLAN data gathered from the WLAN. At 404, the operations can include the WNMS gathering current WLAN data for the geographic area represented by the location map. At 406, the operations can include the WNMS generating a combined color map for the geographic area represented by the location map. At 408, the operations can include the WNMS calculating predicted application scores for one or more UE operating within one or more regions of the geographic area represented by the location map by performing forward convolution across a plurality of convolutional layers of the statistical model using the combined color map. At 410, the operations can include displaying the calculated predicted application scores for one or more UE type(s) operating within one or more region(s) of the geographic area and the operations can return to 404 to gather WLAN data for another sampling time slice the operations can be repeated.

In at least one embodiment, the operations can include gathering (412) current, observed application scores (e.g., gathered via one or more application server(s) 152) and displaying (414) the calculated predicted application scores and the observed application scores for one or more UE type(s) for one or more region(s) of the location map and the operations can return to 402, as discussed above.

In still some embodiments, predicted application scores can be compared to observed application scores in order to determine whether the statistical model needs to be re-trained. In such embodiments, the operations can include the WNMS gathering (412) observed application scores for one or more UE operating within the geographic area and comparing (416) the observed application scores to calculated predicted application scores for the one or more UE to determine (418) whether an error threshold is satisfied. In some embodiments, different error thresholds can be provisioned for different application score classes.

Based on a determination at 418, that a particular error threshold is not satisfied, the operations can continue to 420 at which the WNMS re-trains the statistical model using the current WLAN data gathered for the WLAN, the calculated predicted application scores, and the observed application scores and the operations return to 404 once the model is re-trained. Based on a determination at 418, that a particular error threshold is satisfied, the operations can return to 402, as discussed above.

Figure 5:
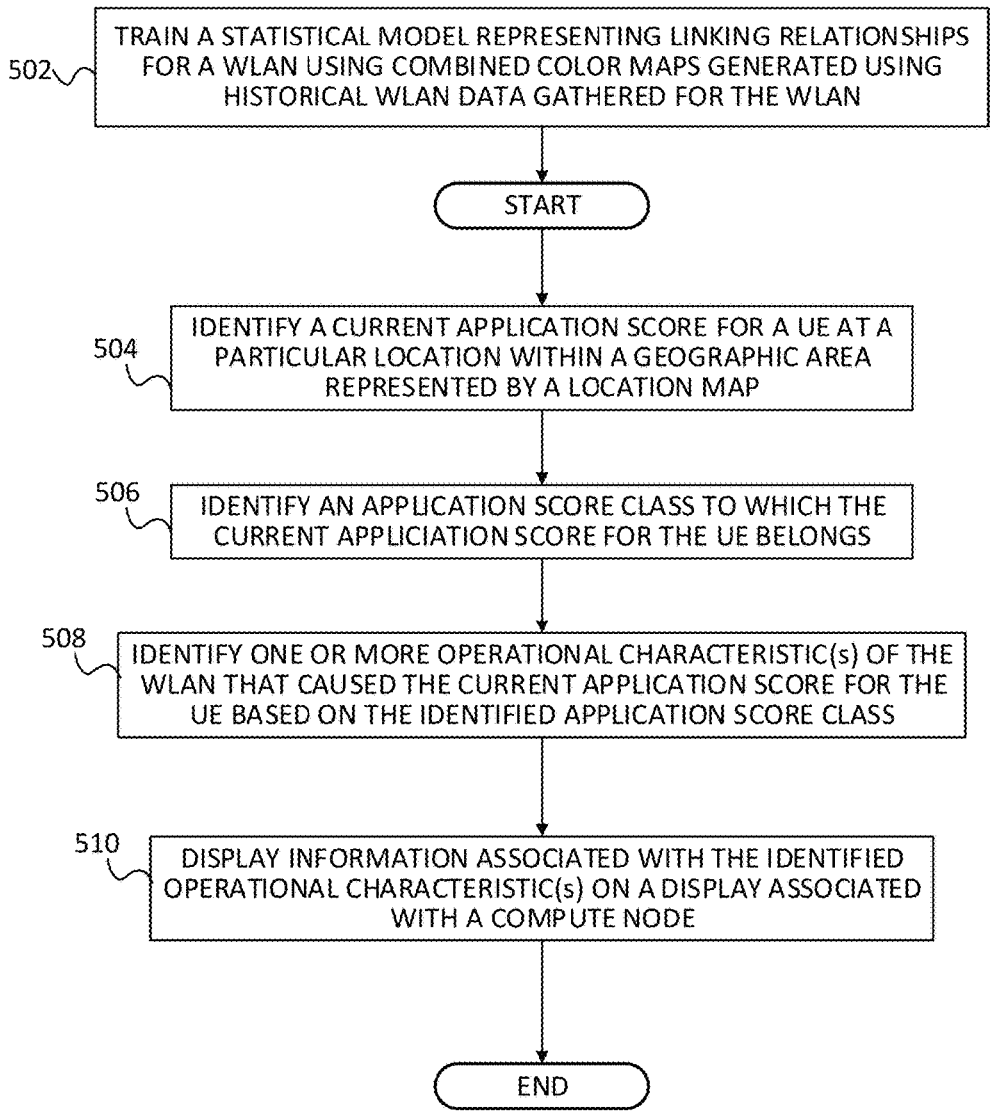
FIG. 5 is a simplified flow diagram illustrating example operations that can be associated with identifying one or more operational characteristics of a wireless network that may be contributing to an observed application score for a user equipment according to one potential embodiment.

Referring to FIG. 5, FIG. 5 is a simplified flow diagram illustrating example operations 500 that can be associated with identifying one or more operational characteristics of a wireless network that may be contributing to a given application score for a UE according to one potential embodiment of the present disclosure. In at least one embodiment, operations 500 can be performed using a WNMS (e.g., WNMS 140) based on WLAN data associated with a particular geographic area represented by a given location map for a WLAN (e.g., location map 111 for WLAN 110).

Prior to performing operations associated with identifying the one or more operational characteristics of the WLAN that may be contributing to a given application score for a UE (say, for example, UE 114.1 as shown in the embodiment of FIG. 1), operations 500 can include training (502) a statistical model representing linking relationships for the WLAN (e.g., relationships linking RF operational characteristics, transmission operational characteristics, and QoS operational characteristics to application scores and/or application score classes) using combined color maps generated for the particular geographic area represented by the location map using historical WLAN data gathered for the particular geographic area of the WLAN over one or more sampling time slices. The statistical model can be trained until an error criterion, as may be provisioned for the WNMS by a human operator, is met.

Following training of the statistical model, the model can be used to identify one or more operational characteristics of the WLAN that may be contributing to the application score for the UE. In some embodiments, operations 500 can be performed in order to identify one or more operational characteristics that may be contributing to a low application score observed for a UE. In still some embodiments, operations 500 can be performed in order to identify one or more operational characteristics that may be contributing to a change in application scores observed for a UE.

At 504, the operations can include the WNMS identifying a current application score for the UE that is located at a particular location within the geographic area represented by the location map. At 506, the operations can include the WNMS identifying an application score class to which the current application score belongs by comparing the current application score to each of a plurality of class threshold values used to characterize each of a plurality of application score classes provisioned for the WNMS.

Upon identifying the application score class to which the current application score for the UE belongs, the operations can include the WNMS identifying (508) one or more operational characteristic(s) of the WLAN that caused the current application score based on the identified application score class. For example, once the application score class is identified, weights and/or weight combinations for one or more neurons (e.g., RF, transmission, QoS, etc.) of one or more layer(s) and/or one or more application score class(es) can be identified as contributing factors to low application scores (e.g., larger weights can be identified as having a greater impact and vice-versa). In another example, observation of weights for back propagation can be used to identify which characteristic(s) may or may not impact application scores more or less.

At 510, the operations can include WNMS 140 displaying information associated with the identified operational characteristics on a display associated with a compute node. Consider one example involving a videoconference application. For this example, the WNMS might display (e.g., via display 128 for compute node 126) low performance (e.g., low MoS) and high contributing weights on the UP QoS and RSSI values that might illustrate that the application has asymmetric QoS (QoS downstream but best effort upstream), which results in the application going below acceptable performance below a target RSSI level for a given area. Consider another example in which the WNMS might display (e.g., via display 128 for compute node 126) a given area showing high performance for real time applications while RSSI and SNR are low (e.g., at the edge of a WAP) and QoS being best effort everywhere and identifying contributing factor(s) as low retry and low time in upstream and downstream transmit (e.g., which could show that even with poor RF conditions, real-time applications can perform well in areas without congestion or interference issues, contrary to common belief that low rates automatically translate into low real time performances).

In some embodiments, identifying operational characteristics can enable the WNMS 140 to identify performance trends associated within a given geographic area. For example, if color changes for a given color map layer exhibits improvements, application performance improvements can be tracked in order to identify such trends.

Figure 6:
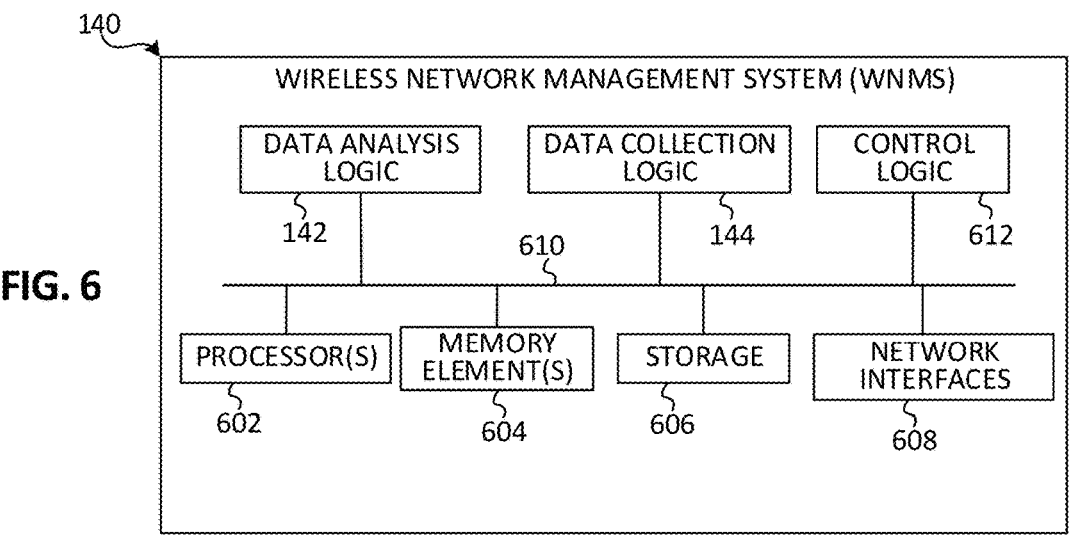
FIGS. 6-7 are simplified block diagrams illustrating example details that can be associated with the communication system in accordance with various potential embodiments.

Referring to FIG. 6, FIG. 6 is a simplified block diagram illustrating example details that can be associated with WNMS 140 in accordance with at least one embodiment of communication system 100. In at least one embodiment, WNMS 140 can include one or more processor(s) 602, one or more memory element(s) 604, storage 606, network interfaces 608, a bus 610, data analysis logic 142, data collection logic 144, and control logic 612. In various embodiments, instructions associated with any logic provisioned for WNMS 140 can overlap in any manner and are not limited to the allocation of instructions and/or operations described herein.

In at least one embodiment, processor(s) 602 is/are at least one hardware processor configured to execute various tasks, operations and/or functions for WNMS 140 as described herein according to software, and/or instructions configured for WNMS 140. In at least one embodiment, memory element(s) 604 and/or storage 606 is/are configured to store data, information, software, and/or instructions associated with WNMS 140, and/or logic configured for memory element(s) 604 and/or storage 606 (e.g., data analysis logic 142 and/or data collection logic 144 can, in various embodiments, be stored using any combination of memory element(s) 604 and/or storage 606). In at least one embodiment, bus 610 can be configured as an interface that enables one or more elements of WNMS (e.g., processor(s) 602, memory element(s) 604, logic, network interfaces, etc.) to communicate in order to exchange information and/or data. In at least one embodiment, bus 610 may be implemented as a fast kernel-hosted interconnect, potentially using shared memory between processes (e.g., logic, etc.), which can enable efficient communication paths between the processes. Note that in some embodiments, storage can be consolidated with memory elements (or vice versa), or can overlap/exist in any other suitable manner.

In various embodiments, network interfaces 608 enable communication between WNMS 140, and other network elements, systems, etc. that may be present in communication system 100 to facilitate operations discussed for various embodiments described herein. In some embodiments, network interfaces 608 can include one or more Ethernet driver(s) and/or controller(s), Fibre Channel driver(s) and/or controller(s), or other similar network interface driver(s) and/or controller(s) to enable communications for WNMS 140 within communication system 100.

In various embodiments, data analysis logic 142 can include instructions that, when executed (e.g., by processor(s) 602), cause WNMS 140 to perform operations including, but not limited to: performing calculations using WLAN data to generate one or more color map layers; applying a grid overlay to color map layers and color maps; merging one or more color map layers; training or retraining a convolutional neural network statistical model; calculating predicted application scores; identifying UE locations within a geographic area representing by a location map; identifying different UE types based on HW and/or SW characteristics; identifying operational characteristics associated with observed application scores; displaying various information, colors, color scales, transparency scales, combinations thereof, or the like for any color map layers, combined color maps, grid overlays, location maps, or the like; cooperating, maintaining, and/or otherwise interacting with logic; data structures; stored data, information, parameters, etc. (e.g., memory element(s), storage, data structures, databases, tables, etc.) of WNMS 140; combinations thereof; and/or any other operations as discussed for various embodiments described herein.

In various embodiments, data collection logic 144 can include instructions that, when executed (e.g., by processor(s) 602), cause WNMS 140 to perform operations including, but not limited to: gathering observed application scores from one or more application server(s) 152; gathering UE HW and/or SW characteristics from user database 124; gathering WLAN RF data from WLC 122; gathering WLAN transmission data from WLC 122; gathering QoS packet marking data for WLAN; cooperating, maintaining, and/or otherwise interacting with logic; data structures; stored data, information, parameters, etc. (e.g., memory element(s), storage, data structures, databases, tables, etc.) of WNMS 140; combinations thereof; and/or any other operations as discussed for various embodiments described herein.

In various embodiments, control logic 612 can include instructions that, when executed, cause WNMS 140 to perform operations, which can include, but not be limited to, providing overall control operations of WNMS 140; cooperating with data analysis logic 142 and data collection logic 144; cooperating, maintaining, and/or otherwise interacting with logic; data structures; stored data, information, parameters, etc. (e.g., memory element(s), storage, data structures, databases, tables, etc.) of WNMS 140; combinations thereof; and/or the like to facilitate various operations as discussed for various embodiments described herein.

Figure 7:
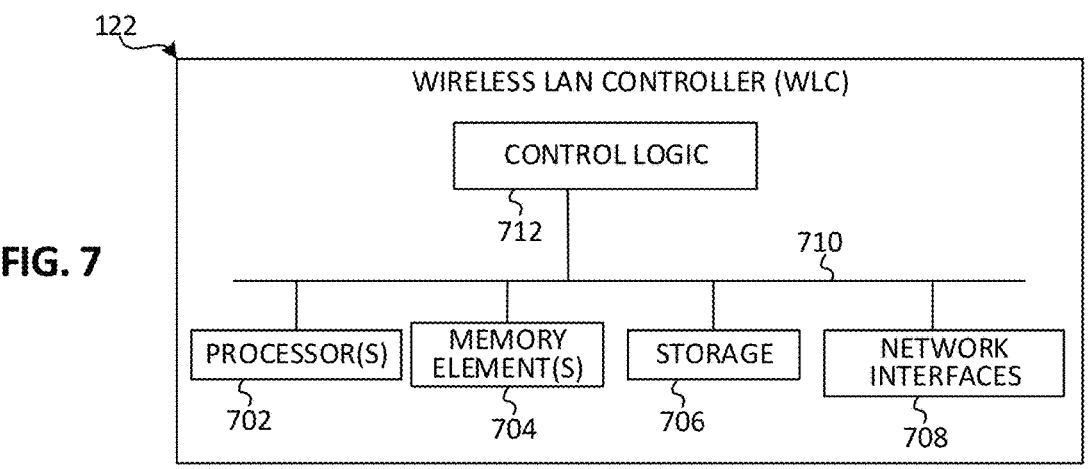

Referring to FIG. 7, FIG. 7 is a simplified block diagram illustrating example details that can be associated with WLC 122 in accordance with at least one embodiment of communication system 100. In at least one embodiment, WLC 122 can include one or more processor(s) 702, one or more memory element(s) 704, storage 706, network interfaces 708, a bus 710, and control logic 712. In various embodiments, instructions associated with any logic provisioned for WLC 122 can overlap in any manner and are not limited to the allocation of instructions and/or operations described herein.

In at least one embodiment, processor(s) 702 is/are at least one hardware processor configured to execute various tasks, operations and/or functions for WLC 122 as described herein according to software, and/or instructions configured for WLC 122. In at least one embodiment, memory element(s) 704 and/or storage 706 is/are configured to store data, information, software, and/or instructions associated with WLC 122, and/or logic configured for memory element(s) 704 and/or storage 706 (e.g., control logic 712 can, in various embodiments, be stored using any combination of memory element(s) 704 and/or storage 706). In at least one embodiment, bus 710 can be configured as an interface that enables one or more elements of WLC 122 to communicate in order to exchange information and/or data. In at least one embodiment, bus 710 may be implemented as a fast kernel-hosted interconnect, potentially using shared memory between processes (e.g., logic, etc.), which can enable efficient communication paths between the processes. Note that in some embodiments, storage can be consolidated with memory elements (or vice versa), or can overlap/exist in any other suitable manner.

In various embodiments, network interfaces 708 enable communication between WLC 122, and other network elements, systems, etc. that may be present in communication system 100 to facilitate operations discussed for various embodiments described herein. In some embodiments, network interfaces 708 can include one or more Ethernet driver(s) and/or controller(s), Fibre Channel driver(s) and/or controller(s), or other similar network interface driver(s) and/or controller(s) to enable communications for WLC 122 within communication system 100.

In various embodiments, control logic 712 can include instructions that, when executed, cause WLC 122 to perform operations, which can include, but not be limited to, providing overall control operations of WLC 122; gathering measurement data or other WLAN data from one or more WAPs 112.1-112.3; cooperating, maintaining, and/or otherwise interacting with logic; data structures; stored data, information, parameters, etc. (e.g., memory element(s), storage, data structures, databases, tables, etc.) of WLC 122; combinations thereof; and/or the like to facilitate various operations as discussed for various embodiments described herein Variations and Implementations In regards to the internal structure associated with communication system 100, appropriate software, hardware, and/or algorithms are being provisioned for WNMS 140, WLC 122, user database 124, compute node 126, any application server(s) 152, and any WAPs (e.g., WAPs 112.1-112.3, etc.) within communication system 100 in order to facilitate operations associated with troubleshooting and predicting application performance and/or identifying operational characteristics of wireless networks in accordance with the teachings of the present disclosure. For example, compute node 126, any application server(s) 152, any WAPs, and any UEs within communication system 100 can also be configured with one or more processor(s), memory element(s), storage, network interfaces, logic, RF transmitters, RF receivers, combinations thereof, or the like to facilitate operations associated with troubleshooting and predicting application performance and/or identifying operational characteristics of wireless networks in accordance with the teachings of the present disclosure.

In various embodiments, wireless LAN controller 122 may be responsible for system wide wireless LAN functions, such as security policies, intrusion prevention, RF management, Quality of Service (QoS) functions, and/or mobility functions for WLAN 110 and one or more WAP(s) deployed within the WLAN.

Communications in a network environment are referred to herein as 'frames', 'messages', 'messaging' and/or 'signaling', which may be inclusive of packets. As discussed herein in this Specification, a packet or frame is a formatted unit of information that can contain control information (e.g., source and destination address, etc.) with or without data, which is also known as payload. In some embodiments, control information can be included in headers and trailers for packets or frames. Packets or frames can be sent and received according to any suitable communication protocols. Suitable communication protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, signaling, frames, messages, requests, responses, replies, queries, etc. are forms of network traffic and, therefore, may comprise one or more packets or frames.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include, but not be limited to: Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), Extensible Messaging and Presence Protocol (XMPP), Simple Object Access Protocol (SOAP), SOAP over Hypertext Transfer Protocol (HTTP), Representational State Transfer (REST), combinations thereof, or the like. In some embodiments, secure communications can be facilitated using TCP/IP Secure Sockets Layer (SSL) communications.

In various embodiments, a UE (e.g., UE 114.1-114.7, UEs 214, and/or any other UE that may be present in communication system 100) can be inclusive of devices used to initiate and/or respond to communications in a network, such as a computer, an electronic device such as an Internet of Things (IoT) device (e.g., an appliance, a thermostat, a sensor, a home automation controller, a voice activated device, a parking meter, etc.), a personal digital assistant (PDA), a laptop or electronic notebook, a gaming system, a vehicle infotainment system, a home entertainment electronic device (e.g., a smart television, digital recording device, speaker, etc.), a cellular telephone, an IP phone, an electronic device having cellular and/or Wi-Fi connection capabilities, a wearable electronic device, or any other device, component, element, or object capable of initiating voice, audio, video, media, or data exchanges within communication system 100. A UE may also be inclusive of a suitable interface to a human user such as a microphone, a display, a keyboard, or other terminal equipment.

A UE may also be any device that seeks to initiate a communication on behalf of another entity or element such as a program, application, a database, or any other component, device, element, or object capable of initiating an exchange within communication system 100. In at least some embodiments, a UE can be associated with users that communicate in communication system 100. In other embodiments, UE may facilitate data exchanges while operating independently of user interactions. Within communication system 100, IP addresses, if used, can be assigned using Dynamic Host Configuration Protocol (DHCP), Stateless Address Auto-configuration (SLAAC), or any suitable variation thereof. IP addresses, if used within communication system 100, can include IP version 4 (IPv4) and/or IPv6 addresses.

In various embodiments, a subscriber associated with a given UE and/or the UE itself can be identified using one or more identifiers such as, for example, an International Mobile Subscriber Identity (IMSI), a Temporary IMSI (T-IMSI), a Serving Temporary Mobile Subscriber Identity (S-TMSI), a Globally Unique Temporary UE Identity (GUTI), a Mobile Station International Subscriber Directory Number (MSISDN), an employee identity, combinations thereof, or the like.

Communication system 100 can include one or more networks, such as WLAN 110, service network 120, and/or one internet 150, which can represent a series of points or network elements of interconnected communication paths for receiving and transmitting messages (e.g., packets of information) that propagate through the one or more networks. These network elements offer communicative interfaces that facilitate communications between the network elements. A network can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), Low Power Network (LPN), Low Power Wide Area Network (LPWAN), Machine to Machine (M2M) network, IoT network, any other appropriate architecture or system that facilitates communications in a network environment, or any suitable combination thereof.

Networks through which communications propagate in communication system 100 can use any suitable technologies for communication including wireless (e.g., 3G/4G/5G/nG, IEEE 802.11, IEEE 802.16, Radio-frequency Identification (RFID), Near Field Communication (NFC), millimeter wave, Bluetooth™, or any other technology as may be defined by IEEE standards, Wi-Fi Alliance standards, combinations thereof or the like), and/or wired (e.g., T1 lines, T3 lines, digital subscriber lines (DSL), Ethernet, Fibre Channel, etc.) communication. Generally, any suitable means of communication may be used such as electric, sound, light, infrared, and/or radio.

In various example implementations, WNMS 140, WLC 122, user database 124, compute node 126, any application server(s) 152, and/or any WAPs (e.g., WAPs 112.1-112.3, etc.) discussed for various embodiments described herein can encompass network elements such as, for example, network appliances, forwarders, routers, servers, switches, gateways, bridges, loadbalancers, firewalls, processors, modules, radio receivers/transmitters or any other suitable device, component, element, or object operable to exchange information that facilitates or otherwise helps to facilitate WLAN troubleshooting, predicting, and/or identifying operations in a network environment (e.g., for networks such as those illustrated in FIG. 1) as described for various embodiments discussed herein. In various embodiments, one or more of WNMS 140, WLC 122, user database 124, compute node 126, any application server(s) 152, and/or any WAPs (e.g., WAPs 112.1-112.3, etc.) discussed herein can include software (or reciprocating software) that can coordinate in order to achieve operations associated with WLAN troubleshooting, predicting and/or identifying operations in a network environment as discussed herein and may include any suitable algorithms, hardware, software, components, modules, logic, clients, interfaces, and/or objects that facilitate the operations thereof. This may be inclusive of appropriate algorithms, communication protocols, interfaces, and/or standards, proprietary and/or non-proprietary, that allow for the effective exchange of data or information.

In various embodiments, WNMS 140, WLC 122, user database 124, compute node 126, any application server(s) 152, and/or any WAPs (e.g., WAPs 112.1-112.3, etc.) as discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of WNMS 140, WLC 122, user database 124, compute node 126, any application server(s) 152, and/or any WAPs (e.g., WAPs 112.1-112.3, etc.) discussed herein could be provided in any database, table, register, control list, cache, storage and/or storage structure: all of which can be referenced at any suitable timeframe in accordance with various embodiments described herein. Any such storage options may, in some embodiments, also be included within the broad term 'memory element' as used herein. Any of potential processing elements, controllers, systems, managers, logic, and/or machines described herein can, in some embodiments, be construed as being encompassed within the broad term 'processor'. In various embodiments, WNMS 140, WLC 122, user database 124, compute node 126, any application server(s) 152, and/or any WAPs (e.g., WAPs 112.1-112.3, etc.) discussed herein can also include suitable interfaces for receiving, transmitting, and/or otherwise communicating data or information in a network environment.

Note that in certain example implementations, operations as outlined herein to facilitate troubleshooting and predicting application performance and/or identifying operational characteristics of a wireless network may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage can store data, software, code, instructions (e.g., processor instructions), logic, parameters, combinations thereof, or the like used for operations described herein. This includes memory elements and/or storage being able to store data, software, code, instructions (e.g., processor instructions), logic, parameters, combinations thereof, or the like that are executed to carry out operations in accordance with teachings of the present disclosure.

A processor (e.g., a hardware processor) can execute any type of instructions associated with data to achieve the operations detailed herein. In one example, a processor can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements described herein could be some type of a programmable processor, programmable digital logic (e.g., a field programmable gate array (FPGA), a DSP processor, an EPROM, a controller, an electrically erasable PROM (EEPROM), or an ASIC that includes digital logic, software, code, electronic instructions, or any suitable combination thereof.

One or more advantages mentioned herein do not in any way suggest that any one of the embodiments described herein necessarily provides all the described advantages or that all the embodiments of the present disclosure necessarily provide any one of the described advantages. Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a server, computer, processor, machine, compute node, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated and/or sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    gathering current wireless local area network (WLAN) data for a WLAN, wherein the WLAN data comprises network data, Radio Frequency (RF) data, and transmission data for a plurality of user equipment (UE) operating within the WLAN;
    generating a plurality of color maps, wherein each color map displays color information associated with operational characteristics of the WLAN;
    merging the plurality of color maps to generate a combined color map; and
    calculating a predicted application score for at least one UE operating within the WLAN based, at least in part, on application of the combined color map to a trained statistical model that represents linking relationships between the WLAN data gathered for the WLAN and a plurality of possible application scores for the plurality of UE.

2. The method of claim 1, wherein the plurality of color maps comprise:
    an RF color map associated with RF data gathered for the WLAN;
    a transmission color map associated with transmission data gathered for the WLAN; and
    a Quality of Service (QoS) color map associated with QoS packet marking data gathered for the plurality of UE.

3. The method of claim 2, wherein the RF color map illustrates brightness information indicating one or more RF signal deviations from averages.

4. The method of claim 1, further comprising:
    gathering historical WLAN data over a plurality of time intervals;
    gathering historical application score data for each respective UE of the plurality of UE over the plurality of time intervals, wherein the historical application score data gathered for each respective UE is associated with application performance of a respective application operating via each respective UE over the plurality of time intervals;
    generating, for each time interval, a plurality of color maps;
    generating, for each time interval, a combined color map based on the plurality of color maps; and
    training the statistical model for each time interval using the combined color map and at least one historical application score for at least one UE.

5. The method of claim 4, wherein the training is performed to train the statistical model to converge towards a minimized error criterion.

6. The method of claim 4, wherein the statistical model is trained for each of a plurality of application score classes.

7. The method of claim 1, further comprising:
    gathering a current application score for a particular UE operating at a particular location;
    comparing the current application score to a plurality of application score classes;
    identifying a particular application score class to which the current application score belongs; and
    identifying one or more operational characteristics of the WLAN that caused the current application score based on application of WLAN data for the particular UE at the particular location to the trained statistical model.

8. The method of claim 7, further comprising displaying at least one of:
    the predicted application score for the particular UE at the particular location on at least one color map of the plurality of color maps or on the combined color map; and
    the predicted application score and the current application score for the particular UE at the particular location on at least one color map of the plurality of color maps or on the combined color map.

9. The method of claim 7, further comprising:
    calculating an error between the current application score and the predicted application score;
    comparing the calculated error to an error threshold; and
    based on a determination that the calculated error does not satisfy the error threshold, re-training the statistical model using the current application score for the particular UE.

10. One or more non-transitory tangible media encoding logic that includes instructions for execution by a processor, wherein the execution causes the processor to perform operations, comprising:
    gathering current wireless local area network (WLAN) data for a WLAN, wherein the WLAN data comprises network data, Radio Frequency (RF) data, and transmission data for a plurality of user equipment (UE) operating within the WLAN;
    generating a plurality of color maps, wherein each color map displays color information associated with operational characteristics of the WLAN;
    merging the plurality of color maps to generate a combined color map; and
    calculating a predicted application score for at least one UE operating within the WLAN based, at least in part, on application of the combined color map to a trained statistical model that represents linking relationships between the WLAN data gathered for the WLAN and a plurality of possible application scores for the plurality of UE.

11. The media of claim 10, wherein the plurality of color maps comprise:
an RF color map associated with RF data gathered for the WLAN;
a transmission color map associated with transmission data gathered for the WLAN; and
a Quality of Service (QoS) color map associated with QoS packet marking data gathered for the plurality of UE.

12. The media of claim 10, wherein the execution causes the processor to perform further operations, comprising:
gathering historical WLAN data over a plurality of time intervals;
gathering historical application score data for each respective UE of the plurality of UE over the plurality of time intervals, wherein the historical application score data gathered for each respective UE is associated with application performance of a respective application operating via each respective UE over the plurality of time intervals;
generating, for each time interval, a plurality of color maps;
generating, for each time interval, a combined color map based on the plurality of color maps; and
training the statistical model for each time interval using the combined color map and at least one historical application score for at least one UE.

13. The media of claim 12, wherein the statistical model is trained for each of a plurality of application score classes.

14. The media of claim 10, wherein the execution causes the processor to perform further operations, comprising:
gathering a current application score for a particular UE operating at a particular location;
comparing the current application score to a plurality of application score classes;
identifying a particular application score class to which the current application score belongs; and
identifying one or more operational characteristics of the WLAN that caused the current application score based on application of WLAN data for the particular UE at the particular location to the trained statistical model.

15. The media of claim 14, wherein the execution causes the processor to perform further operations, comprising displaying at least one of:
the predicted application score for the particular UE at the particular location on at least one color map of the plurality of color maps or on the combined color map; and
the predicted application score and the current application score for the particular UE at the particular location on at least one color map of the plurality of color maps or on the combined color map.

16. The media of claim 14, wherein the execution causes the processor to perform further operations, comprising:
calculating an error between the current application score and the predicted application score;
comparing the calculated error to an error threshold; and
based on a determination that the calculated error does not satisfy the error threshold, re-training the statistical model using the current application score for the particular UE.

17. A wireless network management system, comprising:
at least one memory element for storing data; and
at least one processor for executing instructions associated with the data, wherein the executing causes the wireless network management system to perform operations, comprising:
gathering current wireless local area network (WLAN) data for a WLAN, wherein the WLAN data comprises network data, Radio Frequency (RF) data, and transmission data for a plurality of user equipment (UE) operating within the WLAN;
generating a plurality of color maps, wherein each color map displays color information associated with operational characteristics of the WLAN;
merging the plurality of color maps to generate a combined color map; and
calculating a predicted application score for at least one UE operating within the WLAN based, at least in part, on application of the combined color map to a trained statistical model that represents linking relationships between the WLAN data gathered for the WLAN and a plurality of possible application scores for the plurality of UE.

18. The wireless network management system of claim 17, wherein the plurality of color maps comprise:
an RF color map associated with RF data gathered for the WLAN;
a transmission color map associated with transmission data gathered for the WLAN; and
a Quality of Service (QoS) color map associated with QoS packet marking data gathered for the plurality of UE.

19. The wireless network management system of claim 17, wherein the executing causes the wireless network management system to perform further operations, comprising:
gathering historical WLAN data over a plurality of time intervals;
gathering historical application score data for each respective UE of the plurality of UE over the plurality of time intervals, wherein the historical application score data gathered for each respective UE is associated with application performance of a respective application operating via each respective UE over the plurality of time intervals;
generating, for each time interval, a plurality of color maps;
generating, for each time interval, a combined color map based on the plurality of color maps; and
training the statistical model for each time interval using the combined color map and at least one historical application score for at least one UE.

20. The wireless network management system of claim 17, wherein the executing causes the wireless network management system to perform further operations, comprising:
gathering a current application score for a particular UE operating at a particular location;
comparing the current application score to a plurality of application score classes;
identifying a particular application score class to which the current application score belongs; and
identifying one or more operational characteristics of the WLAN that caused the current application score based on application of WLAN data for the particular UE at the particular location to the trained statistical model.

* * * * *